US009883022B2

(12) United States Patent
Barnes et al.

(10) Patent No.: US 9,883,022 B2
(45) Date of Patent: Jan. 30, 2018

(54) TACTILE MESSAGING VIA A WEARABLE DEVICE

(71) Applicant: WiseWear Corporation, San Antonio, TX (US)

(72) Inventors: Ronald A. Barnes, San Antonio, TX (US); David P. Elam, Jr., San Antonio, TX (US); Bennett L. Ibey, San Antonio, TX (US); Gerald J. Wilmink, San Antonio, TX (US); Jason B. Wilson, Fair Oaks Ranch, TX (US)

(73) Assignee: WISEWEAR CORPORATION, San Antonio, TX (US)

( * ) Notice: Subject to any disclaimer, the term of this patent is extended or adjusted under 35 U.S.C. 154(b) by 0 days.

(21) Appl. No.: 14/937,509

(22) Filed: Nov. 10, 2015

(65) Prior Publication Data
US 2017/0134560 A1 May 11, 2017

(51) Int. Cl.
H04W 24/00 (2009.01)
H04M 1/725 (2006.01)
H04L 12/58 (2006.01)
H04L 29/08 (2006.01)
H04W 4/02 (2009.01)
H04W 4/12 (2009.01)
G06F 1/16 (2006.01)
G06F 3/01 (2006.01)
(Continued)

(52) U.S. Cl.
CPC ........ H04M 1/72552 (2013.01); G06F 1/163 (2013.01); G06F 1/1694 (2013.01); G06F 3/011 (2013.01); G06F 3/016 (2013.01); G06F 3/017 (2013.01); G08B 15/004 (2013.01); G08B 25/016 (2013.01); H04L 51/20 (2013.01); H04L 67/306 (2013.01); H04M 1/72569 (2013.01); H04W 4/023 (2013.01); H04W 4/12 (2013.01); F41H 9/10 (2013.01); G06F 2200/1636 (2013.01); G08B 1/08 (2013.01); G08B 15/02 (2013.01); H04M 1/72541 (2013.01)

(58) Field of Classification Search
CPC .......... H04M 1/72552; H04M 1/72569; H04L 51/20; H04L 67/306; H04W 4/023; H04W 4/12
USPC ..................................... 455/456.1
See application file for complete search history.

(56) References Cited

U.S. PATENT DOCUMENTS

| | | | |
|---|---|---|---|
| 8,825,113 B2 * | 9/2014 | Kim | G06F 1/1624 345/173 |
| 9,374,688 B2 * | 6/2016 | Kim | H04W 4/12 |
| 2015/0046836 A1 * | 2/2015 | Kim | G06F 3/03 715/748 |

* cited by examiner

Primary Examiner — Amancio Gonzalez
(74) Attorney, Agent, or Firm — H. Barrett Spraggins; Kennedy Lenart Spraggins LLP

(57) ABSTRACT

In a particular embodiment, methods, apparatuses, computer program products, and devices for tactile messaging include receiving motion data from an accelerometer within a wearable device and determining that the received motion data matches a particular defined motion pattern of a plurality of defined motion patterns. In the particular embodiment, tactile messaging includes in response to determining that the received motion data matches the particular defined motion pattern, identifying one or more recipients and a message content that correspond to the particular defined motion pattern. Tactile messaging, according to the particular embodiment, also includes in response to identifying the one or more recipients and the message content that correspond to the particular defined motion pattern, initiating transmission, to the identified one or more recipients, a text message that includes the message content.

12 Claims, 19 Drawing Sheets

(51) Int. Cl.
G08B 15/00 (2006.01)
G08B 25/01 (2006.01)
*F41H 9/10* (2006.01)
*G08B 1/08* (2006.01)
*G08B 15/02* (2006.01)

TACTILE MESSAGING VIA A WEARABLE DEVICE

BACKGROUND OF THE INVENTION

Field of the Invention

The field of the invention is data processing, or, more specifically, methods, apparatuses, devices, and computer program products for tactile messaging via a wearable device.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Such computer systems may now be integrated within wearable devices, which provide for functionality within a form that allows for users to employ computational services in a manner that has not been possible up until this point.

SUMMARY OF THE INVENTION

In a particular embodiment, methods, apparatuses, computer program products, and devices for tactile messaging include receiving motion data from an accelerometer within a wearable device and determining that the received motion data matches a particular defined motion pattern of a plurality of defined motion patterns. In this particular embodiment, tactile messaging includes in response to determining that the received motion data matches the particular defined motion pattern, identifying one or more recipients and a message content that correspond to the particular defined motion pattern. Tactile messaging, according to this particular embodiment, also includes in response to identifying the one or more recipients and the message content that correspond to the particular defined motion pattern, initiating transmission, to the identified one or more recipients, a text message that includes the message content.

In a particular embodiment, methods, apparatuses, computer program products, and devices for tactile messaging include receiving, from a user, indications of an input message content and one or more recipients and a selection of a particular defined motion pattern of a plurality of defined motion patterns. In this particular embodiment, tactile messaging also includes associating the particular defined motion pattern with the input message content and the one or more recipients.

In a particular embodiment, methods, apparatuses, computer program products, and devices for tactile messaging include receiving from a user, indications of an input message content and one or more message sources and a selection of a particular tactile feedback sequence of a plurality of tactile feedback sequences. In this particular embodiment, tactile messaging also includes associating the particular tactile feedback sequence with the input message content and the one or more message sources.

In a particular embodiment, methods, apparatuses, computer program products, and devices for tactile messaging include determining a tapping pattern based at least in part on one or more inputs from one or more sensors and determining a response based at least in part on a correspondence between the tapping pattern to one of a plurality of tapping patterns. In this particular embodiment, tactile messaging also includes initiating performance of the response corresponding to the tapping pattern.

In a particular embodiment, methods, apparatuses, computer program products, and devices for tactile messaging include receiving an incoming message that includes metadata and selecting, from a plurality of tactile feedback sequences, a particular tactile feedback sequence that corresponds to the metadata in the received incoming message. In this particular embodiment, tactile messaging also includes instructing a tactile feedback generator on the wearable device to provide the particular tactile feedback sequence.

In a particular embodiment, methods, apparatuses, computer program products, and devices for tactile messaging include receiving motion data from an accelerometer within the wearable device; determining that the received motion data matches a particular defined motion pattern of a plurality of defined motion patterns; in response to determining that the received motion data matches the particular defined motion pattern, identifying one or more recipients and a message content that correspond to the particular defined motion pattern; in response to identifying the one or more recipients and the message content that correspond to the particular defined motion pattern, initiating transmission, to the identified one or more recipients, a text message that includes the message content; confirming at least one of a group of confirmation tasks; and in response to confirming at least one of the group of confirmation tasks, instructing a tactile feedback generator within the wearable device to provide tactile feedback to the user of the wearable device.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
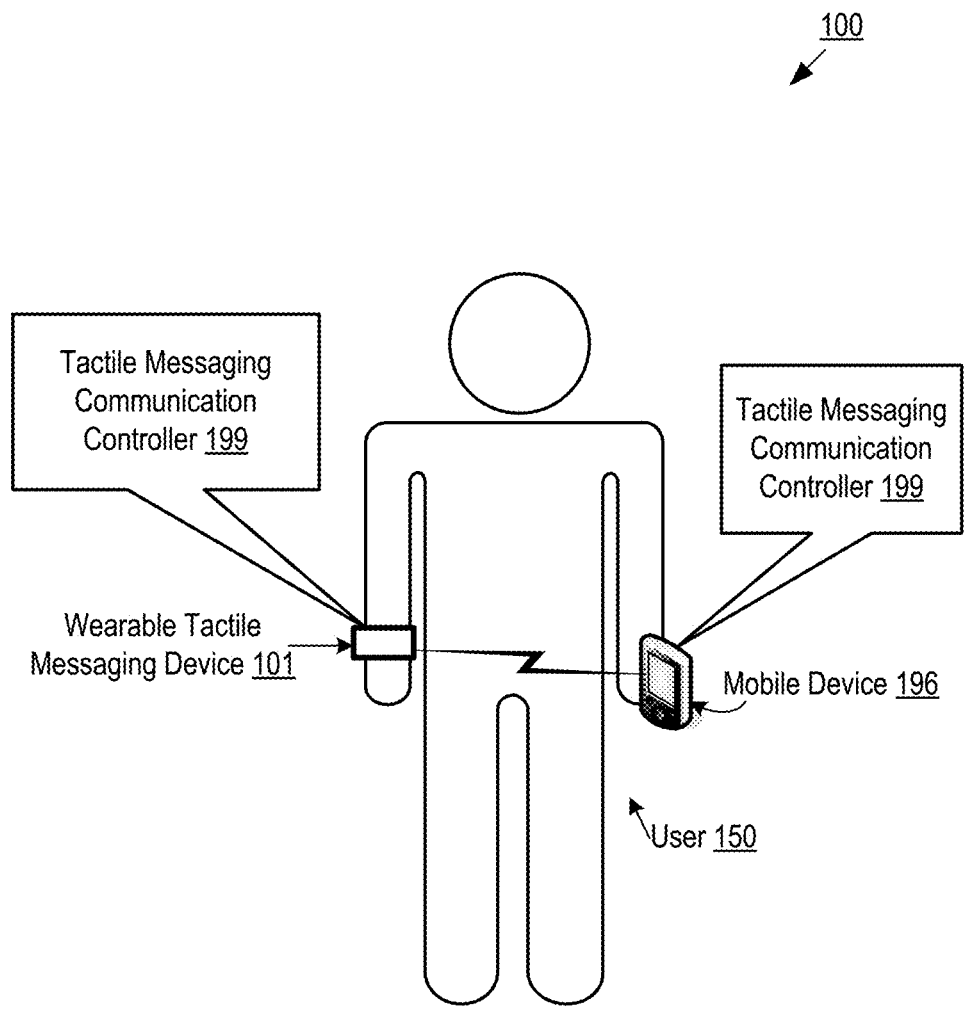
FIG. 1 sets forth a diagram of an illustrative embodiment of an apparatus for tactile messaging via a wearable device.

Exemplary methods, apparatuses, computing devices, and computer program products for tactile messaging via a wearable device in accordance with the present invention are described with reference to the accompanying drawings, beginning with FIG. 1. FIG. 1 sets forth a diagram of an illustrative embodiment of an apparatus (100) for tactile messaging via a wearable device. In the example of FIG. 1, the apparatus (100) includes a wearable tactile messaging device (101) and a mobile device (196).

A wearable tactile messaging device is any device that is wearable and includes automated computing machinery for performing tactile messaging. Non-limiting examples of wearable tactile messaging devices include smart wristwatches, bracelets, straps, pendants, and any other forms of wearable devices capable of performing tactile messaging. In the example of FIG. 1, the wearable tactile messaging device (101) is a smart strap attached to the wrist of a user (150). Readers of skill in the art will recognize that wearable tactile messaging devices may be placed on any number of locations on a user.

In the example of FIG. 1, both the wearable tactile messaging device (101) and the mobile device (196) include a tactile messaging communication controller (199) that is configured for tactile messaging. A tactile messaging communication controller includes one or more computing components for performing tactile messaging. Examples of tactile messaging include detecting tactile input or providing tactile feedback. In a particular embodiment, the tactile messaging controller (199) may utilize an accelerometer for detecting motion data generated in response to a user providing tactile input, such as for example, the user tapping on the wearable tactile messaging device. In another embodiment, the tactile messaging controller (199) may utilize a tactile feedback generator that provides tactile feedback. For example, the tactile feedback generator may vibrate.

In a particular embodiment, a tactile messaging communication controller may be configured to utilize data from one or more sensors that are either coupled to the wearable tactile messaging device or are part of the wearable tactile messaging device. Non-limiting examples of the types of sensors that may be available to a wearable tactile messaging device include a hydration sensor, a heart rate monitor, an ECG monitor, a pulse oximeter, a thermometer, an electromyography (EMG) sensor, an accelerometer, a gyroscope, a Global Positioning System (GPS) location sensor, an environmental condition sensor, and many other types of sensors.

To acquire data from these sensors, a wearable tactile messaging device may include data acquisition (DAQ) hardware for periodically polling or receiving data from one or more of the sensors available to the wearable tactile messaging device. For example, circuitry within the wearable tactile messaging device may monitor the existence and strength of a signal from a sensor and process any signals received from the sensor. The wearable tactile messaging device (101) may also include circuitry for processing the sensor data. For example, the wearable tactile messaging device (101) may include circuitry for converting sensor data to another data form, such as motion data, physiological data, or environmental condition data. That is, the wearable tactile messaging device (101) of FIG. 1 may include the computing components necessary to receive, process, and transform sensor data into a type of data that is usable in a process for either detecting tactile input from a user or providing tactile feedback to the user.

In a particular embodiment, the tactile messaging communication controller (199) is configured to perform tactile messaging by receiving motion data from an accelerometer within a wearable device and determining that the received motion data matches a particular defined motion pattern of a plurality of defined motion patterns. In a particular embodiment, the tactile messaging communication controller (199) on the mobile device (196) may be configured to receive the motion data from the wearable tactile messaging device (101). In a particular embodiment, the tactile messaging communication controller (199) is configured to receive motion data from one or more multiple sources, such as an accelerometer and a gyroscope. A defined motion pattern is a collection of motion data that is predetermined to correspond to motion data generated in response to a user tapping, in a particular sequence, on the wearable device.

In the example of FIG. 1, the tactile messaging communication controller (199) is also configured to perform tactile messaging by identifying, in response to determining that the received motion data matches the particular defined motion pattern, one or more recipients and a message content that correspond to the particular defined motion pattern. Each defined motion pattern may be configured to correspond to a particular set of recipients and a particular message content.

The tactile messaging communication controller (199) is also configured to initiate transmission, to the identified one or more recipients, a text message that includes the message content, in response to identifying the one or more recipients and the message content that correspond to the particular defined motion pattern. For example, the user may generate motion data by tapping on the wearable device and the wearable device may recognize the motion as a particular pattern and perform an action associated with that particular pattern, such as send a text message to a particular person.

In another particular embodiment, the tactile messaging communication controller (199) is configured to receive, from a user, indications of an input message content, one or more recipients, and a selection of a particular defined motion pattern of a plurality of defined motion patterns. In this particular embodiment, the tactile messaging communication controller (199) is also configured to associate the particular defined motion pattern with the input message content and the one or more recipients. For example, a user may utilize a graphical user interface on an application to set up the tactile messaging communication controller. In configuring the tactile messaging communication controller, a user may be able to match a tactile input with an output, such as generation of a text message with a specific message that is sent to a particular person.

In another particular embodiment, the tactile messaging communication controller (199) is configured to receive an incoming message that includes metadata and to select from a plurality of tactile feedback sequences, a particular tactile feedback sequence that corresponds to the metadata in the received incoming message. In this particular embodiment, the tactile messaging communication controller (199) is configured to instruct a tactile feedback generator on the wearable device to provide the particular tactile feedback sequence. For example, the tactile messaging communication controller may be configured to provide a particular tactile feedback in response to receiving a text message with a particular message content. In this example, the tactile message communication controller may be configured to instruct a feedback generator within the wearable device to vibrate twice in response to receiving a text message having a particular text message content.

In another particular embodiment, the tactile messaging communication controller (199) is configured to receive from a user, indications of an input message content, one or more message sources, and a selection of a particular tactile feedback sequence of a plurality of tactile feedback sequences. In this particular embodiment, the tactile messaging communication controller (199) is also configured to associate the particular tactile feedback sequence with the input message content and the one or more message sources. For example, a user may utilize a graphical user interface on an application to set up the tactile messaging communication controller (199). In configuring the tactile messaging communication controller (199), a user may be able to match the receipt of incoming text message having a particular message content with a specific tactile feedback. The tactile messaging communication controller may instruct the feedback generator on a wearable device to vibrate in a particular sequence in response to receiving the incoming message.

In another particular embodiment, the tactile messaging communication controller (199) is configured to determine a tapping pattern based at least in part on one or more inputs from one or more sensors and determining a response based at least in part on a correspondence between the tapping pattern to one of a plurality of tapping patterns. In this particular embodiment, the tactile messaging communication controller (199) is also configured to initiate performance of the response corresponding to the tapping pattern. Examples of responses may include initiating other actions besides transmission of text messages, such as controlling an application on a mobile device or the wearable device, dispersing a chemical spray, launching a projectile, or a variety of other actions that would occur to one of skill in the art.

Figure 2:
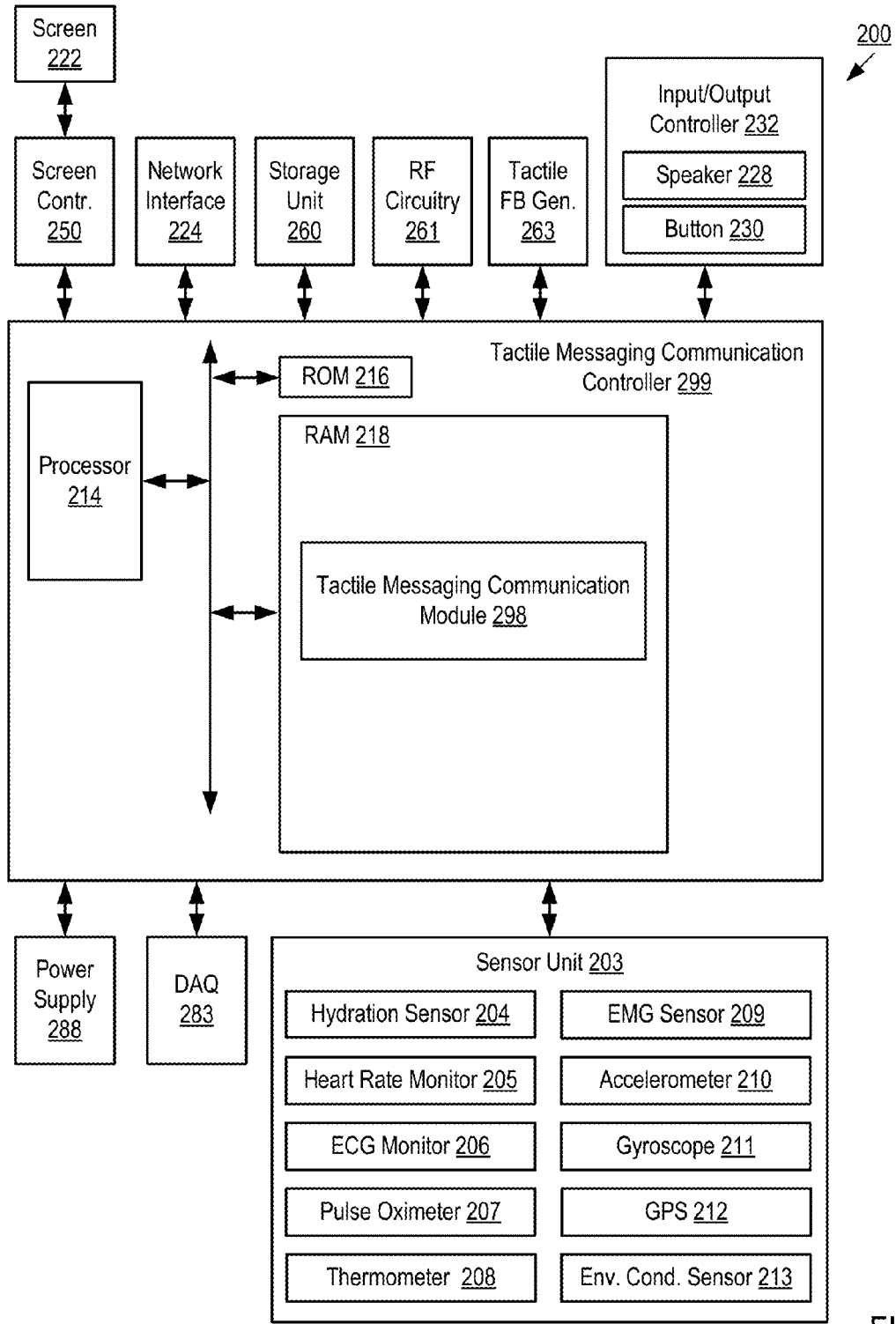
FIG. 2 sets forth a diagram of an example apparatus configured for tactile messaging via a wearable device.

For further explanation, FIG. 2 sets forth a diagram of an example apparatus (200) configured for tactile messaging via a wearable device. In a particular embodiment, the apparatus (200) is a computing device that may be part of the wearable tactile computing device (101) described in FIG. 1. In another embodiment, the apparatus (200) is a computing device that may be part of the mobile device (196) described in FIG. 1.

The apparatus (200) includes a tactile messaging communication controller (299) that includes a processor (214), read only memory (ROM) (216), and random access memory (RAM) (218). The RAM (218) includes a tactile messaging communication module (298). Although, in the example of FIG. 2, the tactile messaging communication module (298) is included in RAM (218), Readers of skill in the art will recognize that the tactile messaging communication module (298) may be included in other storage locations, such as the ROM (216) and an external storage unit (260), which is coupled for data communications with the tactile messaging communication controller (299).

In the example of FIG. 2, the apparatus (200) also includes a power supply (288), a screen (222), a screen controller (250), a network interface (224), an input/output controller (232) having a speaker (228) and a button (230), a data acquisition processing unit (DAQ) (283), and a sensor unit (203). The apparatus (200) also includes a tactile feedback generator (263). A tactile feedback generator may generate haptic output such as vibrations of different intensities, durations, or combinations, or patterns of vibrations of different intensities and durations. The sensor unit (203) of FIG. 2 includes sensors for generating, capturing, and transmitting tactile input, such as for example, motion data. In the example of FIG. 2, the sensor unit (203) includes an accelerometer (210), a gyroscope (211), and a global positioning system unit (212).

An accelerometer measures proper acceleration, which is the acceleration it experiences relative to freefall and is the acceleration felt by people and objects. Put another way, at any point in spacetime the equivalence principle guarantees the existence of a local inertial frame, and an accelerometer measures the acceleration relative to that frame. Such accelerations are popularly measured in terms of g-force. Conceptually, an accelerometer behaves as a damped mass on a spring. When the accelerometer experiences an acceleration, the mass is displaced to the point that the spring is able to accelerate the mass at the same rate as the casing. The displacement is then measured to give the acceleration. Modern accelerometers are often small micro electro-mechanical systems (MEMS), and are indeed the simplest MEMS devices possible, consisting of little more than a cantilever beam with a proof mass (also known as seismic mass). Damping results from the residual gas sealed in the device. As long as the Q-factor is not too low, damping does not result in a lower sensitivity. Most micromechanical accelerometers operate in-plane, that is, they are designed to be sensitive only to a direction in the plane of the die. By integrating two devices perpendicularly on a single die a two-axis accelerometer can be made. By adding another out-of-plane device three axes can be measured. Such a combination may have much lower misalignment error than three discrete models combined after packaging. Micromechanical accelerometers are available in a wide variety of measuring ranges, reaching up to thousands of g's.

A gyroscope is a device for measuring or maintaining orientation, based on the principles of angular momentum. Mechanical gyroscopes typically comprise a spinning wheel or disc in which the axle is free to assume any orientation. Although the orientation of the spin axis changes in response to an external torque, the amount of change and the direction of the change is less and in a different direction than it would be if the disk were not spinning. When mounted in a gimbal (which minimizes external torque), the orientation of the spin axis remains nearly fixed, regardless of the mounting platform's motion. Gyroscopes based on other operating principles also exist, such as the electronic, microchip-packaged MEMS gyroscope devices found in consumer electronic devices, solid-state ring lasers, fibre optic gyroscopes, and the extremely sensitive quantum gyroscope. A MEMS gyroscope takes the idea of the Foucault pendulum and uses a vibrating element, known as a MEMS (Micro Electro-Mechanical System). The integration of the gyroscope has allowed for more accurate recognition of movement within a 3D space than the previous lone accelerometer within a number of smartphones. Gyroscopes in consumer electronics are frequently combined with accelerometers (acceleration sensors) for more robust direction- and motion-sensing.

The Global Positioning System (GPS) is a space-based satellite navigation system that provides location and time information in all weather conditions, anywhere on or near the Earth where there is an unobstructed line of sight to four or more GPS satellites. In general, GPS receivers are composed of an antenna, tuned to the frequencies transmitted by the satellites, receiver-processors, and a highly stable clock (often a crystal oscillator).

The sensor unit (203) of FIG. 2 also includes a sensor (213) for generating, capturing, and transmitting environmental condition data. Environmental condition data may include any indications of the environment. In a particular embodiment, environmental condition data may indicate weather conditions, such as humidity level, precipitation measurements, cloud coverage, and temperature. Environmental conditions may also indicate whether the user is inside or outside. For example, a user may provide input to the wearable tactile messaging device indicating that the user is indoors. In another embodiment, environmental condition data may be measured by the wearable tactile messaging device. For example, the apparatus (200) may include a sensor that monitors humidity level or temperature surrounding the wearable tactile messaging device. In another embodiment, the apparatus (200) may use one or more network interfaces to receive indications of environmental conditions, such as from a weather indication application, or from a local environmental condition indication device, such as a networked humidity and temperature sensor.

The sensor unit (203) of FIG. 2 also includes sensors for generating, capturing, and transmitting physiological data. In the example of FIG. 2, the sensor unit (203) includes a hydration sensor (204), a heart rate monitor (205), an electrocardiograph (ECG) monitor (206), a pulse oximeter (207), a thermometer (208), and an electromyograph (209) for performing electromyography (EMG).

A hydration sensor may be any type of sensor capable of measuring a hydration level of a person. Measuring a hydration level of a person may be performed by a variety of methods via a variety of systems, including but not limited to measuring transepidermal water loss (TWL) with a skin hydration probe. TWL is defined as the measurement of the quantity of water that passes from inside a body through the epidermal layer (skin) to the surrounding atmosphere via diffusion and evaporation processes.

A heart rate monitor (HRM) typically functions by detecting an electrical signal that is transmitted through the heart muscle as the heart contracts. This electrical activity can be detected through the skin. An ECG monitor also generates an activity pattern based on electrical activity of the heart. On the ECG, instantaneous heart rate is typically calculated using the R wave-to-R wave (RR) interval and multiplying/dividing in order to derive heart rate in heartbeats/min.

A pulse oximeter is a medical device that indirectly monitors the oxygen saturation of a user's blood (as opposed to measuring oxygen saturation directly through a blood sample) and changes in blood volume in the skin, producing a photoplethysmogram. A typical pulse oximeter utilizes an electronic processor and a pair of small light-emitting diodes (LEDs) facing a photodiode through a translucent part of the patient's body, usually a fingertip or an earlobe. One LED is red, with wavelength of 660 nm, and the other is infrared with a wavelength of 940 nm. Absorption of light at these wavelengths differs significantly between blood loaded with oxygen and blood lacking oxygen. Oxygenated hemoglobin absorbs more infrared light and allows more red light to pass through. Deoxygenated hemoglobin allows more infrared light to pass through and absorbs more red light. The LEDs flash about thirty times per second which allows the photodiode to respond to the red and infrared light separately. The amount of light that is transmitted (in other words, that is not absorbed) is measured, and separate normalized signals are produced for each wavelength. These signals fluctuate in time because the amount of arterial blood that is present increases (literally pulses) with each heartbeat. By subtracting the minimum transmitted light from the peak transmitted light in each wavelength, the effects of other tissues is corrected for. The ratio of the red light measurement to the infrared light measurement is then calculated by the processor (which represents the ratio of oxygenated hemoglobin to deoxygenated hemoglobin), and this ratio is then converted to SpO2 by the processor via a lookup table.

A thermometer is a device that measures temperature or a temperature gradient using a variety of different principles. A thermistor is an example of a type of thermometer that may be used to measure temperature. A thermistor is a type of resistor whose resistance varies significantly with temperature, more so than in standard resistors. The word is a portmanteau of thermal and resistor. Thermistors are widely used as inrush current limiters, temperature sensors, self-resetting overcurrent protectors, and self-regulating heating elements.

An electromyograph detects the electrical potential generated by muscle cells when these cells are electrically or neurologically activated. The signals can be analyzed to detect medical abnormalities, activation level, or recruitment order or to analyze the biomechanics of human or animal movement.

The data acquisition (DAQ) hardware (283) is configured for periodically polling or receiving data from one or more sensors. For example, circuitry within the DAQ (283) may monitor the existence and strength of a signal from a sensor and process any signals received the sensor. The DAQ (283) may also include circuitry for processing the sensor data. For example, the DAQ (283) may include circuitry for conversion of sensor data to another data form, such as motion data, physiological data, or environmental condition data. That is, the DAQ (283) of FIG. 2 may include the computing components necessary to receive, process, and transform sensor data into a type of data that is usable in a process for tactile messaging.

The tactile messaging communication module (298) comprises program instructions that when executed cause the processor (214) within the tactile messaging communication controller (299) to carry out steps for tactile messaging. As discussed above, tactile messaging may include detecting tactile input and providing tactile feedback as output. Specifically, the tactile messaging communication module (298) includes program instructions that when executed by the processor (214) cause the tactile messaging communication controller (299) to perform tactile messaging by receiving motion data from an accelerometer within a wearable device and determining that the received motion data matches a particular defined motion pattern of a plurality of defined motion patterns. In a particular embodiment, the tactile messaging communication module (298) includes program instructions that when executed by the processor (214) cause the tactile messaging communication controller (299) to receive motion data from one or more multiple sources, such as an accelerometer and a gyroscope. A defined motion pattern is a collection of motion data that is predetermined to correspond to motion data generated in response to a user tapping, in a particular sequence, on the wearable device.

In the example of FIG. 2, the tactile messaging communication module (298) includes program instructions that when executed by the processor (214) cause the tactile messaging communication controller (299) to perform tactile messaging by identifying, in response to determining that the received motion data matches the particular defined motion pattern, one or more recipients and a message content that correspond to the particular defined motion pattern. Each defined motion pattern may be configured to correspond to a particular set of recipients and a particular message content.

The tactile messaging communication module (298) includes program instructions that when executed by the processor (214) cause the tactile messaging communication controller (299) to initiate transmission, to the identified one or more recipients, a text message that includes the message content, in response to identifying the one or more recipients and the message content that correspond to the particular defined motion pattern. For example, the user may generate motion data by tapping on the wearable device and the wearable device may recognize the motion as a particular pattern and perform an action associated with that particular pattern, such as send a text message to a particular person.

In another particular embodiment, the tactile messaging communication module (298) includes program instructions that when executed by the processor (214) cause the tactile messaging communication controller (299) to receive, from a user, indications of an input message content, one or more recipients, and a selection of a particular defined motion pattern of a plurality of defined motion patterns. In this particular embodiment, the tactile messaging communication module (298) includes program instructions that when executed by the processor (214) cause the tactile messaging communication controller (299) to associate the particular defined motion pattern with the input message content and the one or more recipients. For example, a user may utilize a graphical user interface on an application to set up the tactile messaging communication controller. In configuring the tactile messaging communication controller, a user may be able to match a tactile input with an output, such as generation of a text message with a specific message that is sent to a particular person.

In another particular embodiment, the tactile messaging communication module (298) includes program instructions that when executed by the processor (214) cause the tactile messaging communication controller (299) to receive an incoming message that includes metadata and to select from a plurality of tactile feedback sequences, a particular tactile feedback sequence that corresponds to the metadata in the received incoming message. In this particular embodiment, the tactile messaging communication module (298) includes program instructions that when executed by the processor (214) cause the tactile messaging communication controller (299) to instruct the tactile feedback generator on the wearable device to provide the particular tactile feedback sequence. For example, the tactile messaging communication controller (299) may be configured to provide a particular tactile feedback in response to receiving a text message with a particular message content. In this example, the tactile message communication controller (299) may be configured to instruct the feedback generator (263) to vibrate twice in response to receiving a text message having a particular text message content.

In another particular embodiment, the tactile messaging communication module (298) includes program instructions that when executed by the processor (214) cause the tactile messaging communication controller (299) to receive from a user, indications of an input message content, one or more message sources, and a selection of a particular tactile feedback sequence of a plurality of tactile feedback sequences. In this particular embodiment, the tactile messaging communication controller (199) is also configured to associate the particular tactile feedback sequence with the input message content and the one or more message sources. For example, a user may utilize a graphical user interface on an application to set up the tactile messaging communication controller (299). In configuring the tactile messaging communication controller (299), a user may be able to match the receipt of incoming text message having a particular message content with a specific tactile feedback, such as the feedback generator vibrating in a particular sequence.

In another particular embodiment, the tactile messaging communication module (298) includes program instructions that when executed by the processor (214) cause the tactile messaging communication controller (299) to determine a tapping pattern based at least in part on one or more inputs from one or more sensors and determining a response based at least in part on a correspondence between the tapping pattern to one of a plurality of tapping patterns. In this particular embodiment, the tactile messaging communication controller (299) is also configured to initiate performance of the response corresponding to the tapping pattern. Examples of responses may include initiating other actions besides transmission of text messages, such as controlling an application on a mobile device or the wearable device, dispersing a chemical spray, launching a projectile, or a variety of other actions that would occur to one of skill in the art.

The tactile messaging communication controller (299) is also coupled to a network interface (224), such as an Ethernet port, modem port or other network port adapter. The network interface (224) is adapted to connect to a network and to send data to a tactile messaging communication module located on a separate device. The network may include one or a combination of any type of network such as LAN, WAN, WLAN, public switched telephone network, GSM, or otherwise.

The tactile messaging communication controller (299) is also coupled to RF circuitry (261). The RF circuitry (261)

may include circuitry for an antenna system, an RF transceiver, one or more amplifiers, a tuner, one or more oscillators, a digital signal processor, a CODEC chipset, a subscriber identity module (SIM) card, and memory. The RF circuitry (261) may communicate with networks such as the Internet, a cellular telephone network, a wireless local area network, and other devices using wireless communication protocols. These wireless communications protocols may include Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol.

In a particular embodiment, the power supply (288) may include circuitry used for inductive charging. Inductive charging (also known as "wireless charging") uses an electromagnetic field to transfer energy between two objects. This is usually done with a charging station. Energy is sent through an inductive coupling to an electrical device, which can then use that energy to charge batteries or run the device. Induction chargers typically use an induction coil to create an alternating electromagnetic field from within a charging base station, and a second induction coil in the portable device takes power from the electromagnetic field and converts it back into electrical current to charge the battery. The two induction coils in proximity combine to form an electrical transformer. Greater distances between sender and receiver coils can be achieved when the inductive charging system uses resonant inductive coupling. Recent improvements to this resonant system include using a movable transmission coil (i.e., mounted on an elevating platform or arm), and the use of advanced materials for the receiver coil made of silver plated copper or sometimes aluminum to minimize weight and decrease resistance due to the skin effect.

Figure 3:
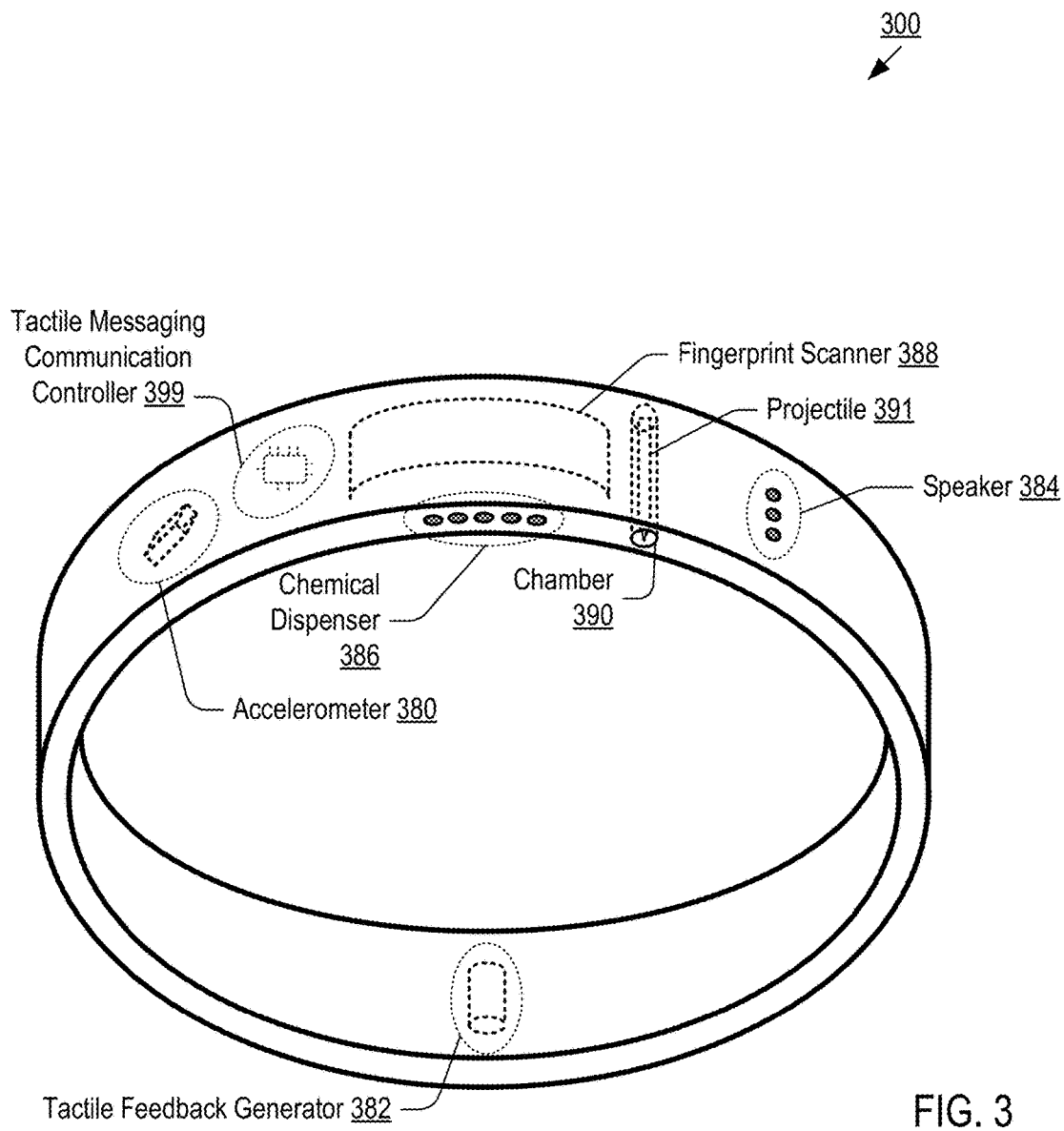
FIG. 3 sets forth a diagram of an example wearable tactile messaging device configured for tactile messaging.

For further explanation, FIG. 3 sets forth a diagram of an example wearable tactile messaging device (300) configured for tactile messaging according to embodiments of the present invention. The wearable tactile messaging device (300) includes a tactile messaging communication controller (399), an accelerometer (380), a chemical dispenser (386), a tactile feedback generator (382), a speaker (394), a projectile (391), a chamber (390) and a fingerprint scanner (388).

In a particular embodiment, the tactile messaging communication controller (399) is configured to perform tactile messaging by receiving motion data from an accelerometer within a wearable device and determining that the received motion data matches a particular defined motion pattern of a plurality of defined motion patterns. In a particular embodiment, the tactile messaging communication controller (399) is configured to receive motion data from one or more multiple sources, such as an accelerometer and a gyroscope. A defined motion pattern is a collection of motion data that is predetermined to correspond to motion data generated in response to a user tapping, in a particular sequence, on the wearable device.

The tactile messaging communication controller (399) is also configured to perform tactile messaging by identifying, in response to determining that the received motion data matches the particular defined motion pattern, one or more recipients and a message content that correspond to the particular defined motion pattern. Each defined motion pattern may be configured to correspond to a particular set of recipients and a particular message content.

The tactile messaging communication controller (399) is also configured to initiate transmission, to the identified one or more recipients, a text message that includes the message content, in response to identifying the one or more recipients and the message content that correspond to the particular defined motion pattern. For example, the user may generate motion data by tapping on the wearable device and the wearable device may recognize the motion as a particular pattern and perform an action associated with that particular pattern, such as send a text message to a particular person.

In another particular embodiment, the tactile messaging communication controller (399) is configured to receive, from a user, indications of an input message content, one or more recipients, and a selection of a particular defined motion pattern of a plurality of defined motion patterns. In this particular embodiment, the tactile messaging communication controller (399) is also configured to associate the particular defined motion pattern with the input message content and the one or more recipients. For example, a user may utilize a graphical user interface on an application to set up the tactile messaging communication controller. In configuring the tactile messaging communication controller, a user may be able to match a tactile input with an output, such as generation of a text message with a specific message that is sent to a particular person.

In another particular embodiment, the tactile messaging communication controller (399) is configured to receive an incoming message that includes metadata and to select from a plurality of tactile feedback sequences, a particular tactile feedback sequence that corresponds to the metadata in the received incoming message. In this particular embodiment, the tactile messaging communication controller (399) is configured to instruct a tactile feedback generator on the wearable device to provide the particular tactile feedback sequence. For example, the tactile messaging communication controller may be configured to provide a particular tactile feedback in response to receiving a text message with a particular message content. In this example, the tactile message communication controller may be configured to instruct a feedback generator within the wearable device to vibrate twice in response to receiving a text message having a particular text message content.

In another particular embodiment, the tactile messaging communication controller (399) is configured to receive from a user, indications of an input message content and one or more message sources and a selection of a particular tactile feedback sequence of a plurality of tactile feedback sequences. In this particular embodiment, the tactile messaging communication controller (399) is also configured to associate the particular tactile feedback sequence with the input message content and the one or more message sources. For example, a user may utilize a graphical user interface on an application to set up the tactile messaging communication controller (399). In configuring the tactile messaging communication controller, a user may be able to match the receipt of incoming text message having a particular message content with a specific tactile feedback, such as the feedback generator on a wearable device vibrating in a particular sequence.

In another particular embodiment, the tactile messaging communication controller (399) is configured to determine a tapping pattern based at least in part on one or more inputs from one or more sensors and determining a response based at least in part on a correspondence between the tapping pattern to one of a plurality of tapping patterns. In this particular embodiment, the tactile messaging communication controller (399) is also configured to initiate performance of the response corresponding to the tapping pattern. Examples of responses may include initiating other actions besides transmission of text messages, such as controlling an application on a mobile device or the wearable device, dispersing a chemical spray, launching a projectile, or a variety of other actions that would occur to one of skill in the art.

For example, in some implementations, a user may specify that, in response to the wearable device (300) detecting two consecutive taps, that the wearable device should send an emergency message to a specified list of recipients. For example, a distress message requesting help, where the message is sent to a security service, to an civil emergency response provider, or to both, or to both along with other recipients. Generally, the user may specify that if the wearable device (300) detects an input pattern of a particular sequence of tactile inputs that occur within a given time frame, that the wearable device should perform a response that has been correlated to the particular input pattern. In some cases, the tactile input pattern or motion pattern may be identified from motion data from, for example, an accelerometer, and the motion data may result from a user physically tapping on the wearable device.

Similarly, the wearable device (300) may generate a tactile feedback sequence in response to receiving a particular type of message or detecting an environmental situation. For example, the wearable device (300) may, in response to receiving a message from a particular contact, or in response to a semantic analysis of content of a received message, generate a tactile feedback sequence of one or more vibrations within a particular time frame. As described further below, other examples of tactile messaging, both receiving and transmitting, are described in various embodiments of the wearable device (300).

In some embodiments, the wearable device (300) may also include several components that may be used for tactile messaging, including the accelerometer (380) and the tactile feedback generator (382). The tactile feedback generator (382) may generate haptic output such as vibrations of different intensities, durations, or combinations, or patterns of vibrations of different intensities and durations.

Further, in response to detecting and identifying tactile input or motion data, the wearable device (300) may initiate responses that include generating sound from the speaker (384), emitting a chemical substance from the chemical dispenser (386), projecting a physical implement or the projectile (391) from the chamber (390), or a combination of one or more different types of responses. In some embodiments, verification of user identity using biometric data for the user may be a prerequisite for tactile communications, and in such embodiments, the fingerprint scanner (388) may be used to validate a person's identity based on previously stored fingerprint data. In some embodiments, as an alternative to the wearable device (300) using tapping patterns or motion data to initiate performance of a response, such as transmitting a distress message, a user may specify that if a finger is held on the fingerprint scanner such that the fingerprint scanner authenticates the user, and also if the finger is held on the finger print scanner for a threshold amount of time, for example a few seconds, then the wearable device (300) may initiate performance of a response similar to determining that a particular tapping sequence or motion data had been detected. In this way, without tapping, a user may send a distress message in circumstances that physically tapping the wearable device may be problematic. In other embodiments, a combination of tapping and fingerprint authentication may be used by the wearable device (300) to initiate performance of a response.

In other embodiments, initiation of a response, such as sending a distress message may be in response to other factors. For example, the wearable device (300) may be configured to verify that a route from one geographic point to another geographic point is followed, and if the route is not followed, then a distress message is sent. For example, if a child is wearing the wearable device (300), and if the route is a route home from a bus stop at a certain time, then if the route is not followed, then the wearable device (300) may automatically generate and send a distress message to a specified recipient, such as the mobile device of a parent.

Figure 4:
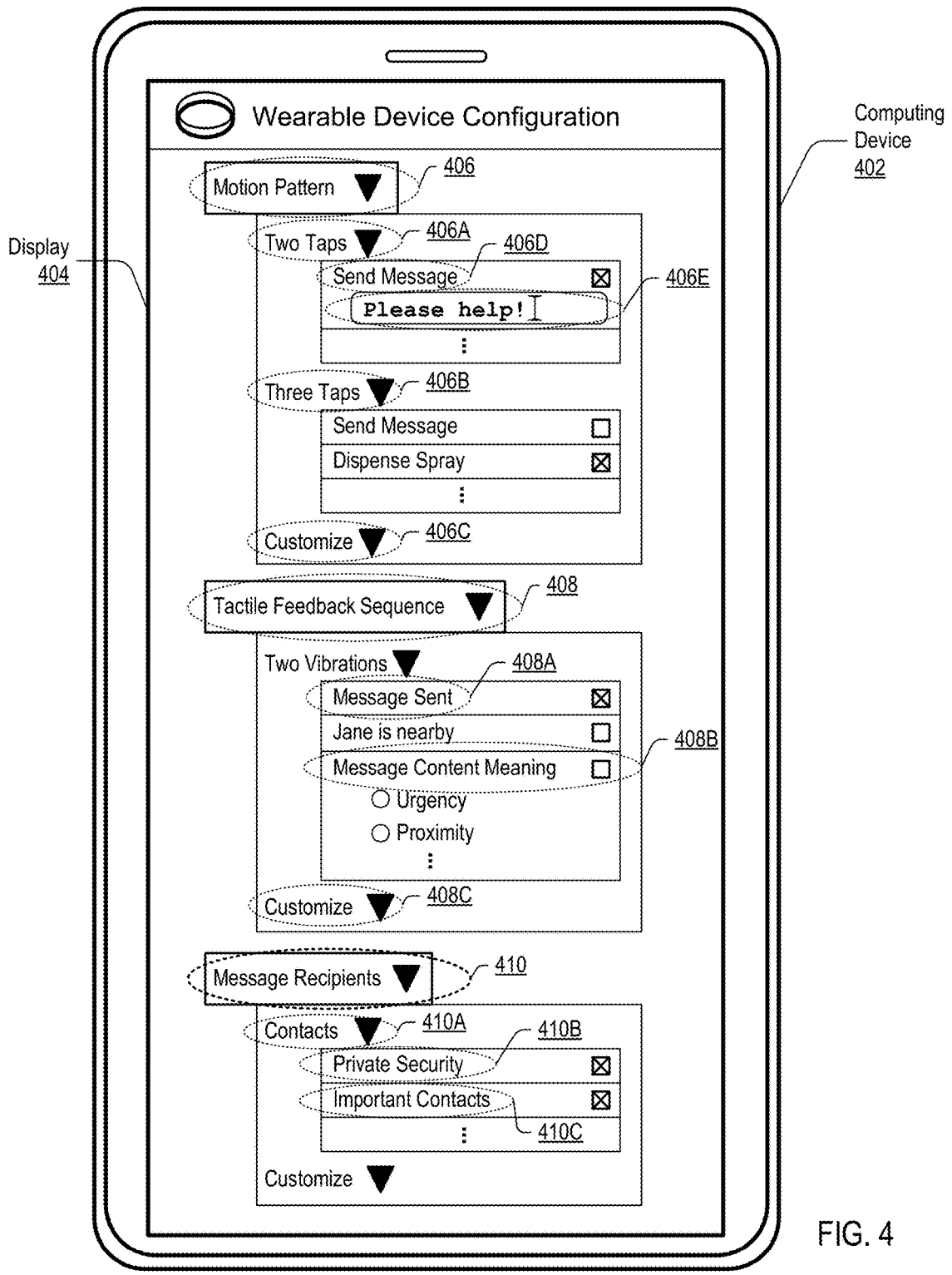
FIG. 4 sets forth a diagram of a computing device configured for providing a user interface through which a user may specify settings for using tactile messaging via a wearable device.

For further explanation, FIG. 4 sets forth a diagram of an example computing device (402) configured for providing a user interface through which a user may specify settings for using tactile messaging via a wearable device, such as the wearable tactile messaging device (101) or the mobile device (196) of FIG. 1. For example, the user interface may be provided from an application installed on the computing device (402). The computing device (402) may be paired with another computing device having a tactile messaging communication controller, and the computing device (402) may provide the tactile messaging communication controller with configuration settings and data received through the user interface.

In this example user interface, a user has options to specify a "Motion Pattern" (406), a "Tactile Feedback Sequence" (408), and "Message Recipients" (410). In this example, a motion pattern, or a tapping input pattern, may be specified in terms of physical taps on the wearable device. For example, "Two Taps" (406A) may be specified to correspond to sending a message, as indicated by "Send Message" (406D). Further, the message may be user configurable, and in this example, the message content, as provided by a user, is "Please help!" as indicated by the text input window (406E).

Similarly, "Three Taps" (406B) may be specified to correspond to dispensing a chemical spray or chemical substance. For example, the chemical spray or substance may be an chemical irritant for self-defense, such as pepper spray, mace, among others.

Generally, a user may specify a motion pattern or tapping pattern with any action or operation to correspond to functionality of the wearable device, and this correspondence may be specified using "Customize" (406C).

In this example user interface, a user has options to specify a "Tactile Feedback Sequence" (408). Where a tactile feedback sequence, or a haptic output pattern, may be a pattern of sensory output generated by one or more components of a wearable device, such as, for example, vibrations using a tactile feedback generator.

In this example, a tactile feedback sequence of two vibrations may be specified to correspond with performance of a function by the wearable device, such as confirmation of a message being sent, as depicted by (408A). For example, if a user taps twice to sent a distress message, as per the settings described above, then when a wearable device has sent the distress message, and the delivery is confirmed, then the wearable device may generate a tactile feedback sequence of two vibrations, in accordance with setting (408A), to provide the user with assurance that the distress message was sent and delivered.

In other examples, a tactile feedback sequence of two vibrations may be specified to correspond to particular message meaning, as depicted by submenu option (408B). In this example, if a received message is parsed, and analyzed to determine semantic information indicating physical proximity of another device, then the corresponding haptic output pattern may be generated, which in this example, is two vibrations. As another example option, if analysis of the received message indicates semantic meaning of urgency, then the corresponding haptic output pattern may be generated. For example, if a received message includes content such as "Please help!," "Come quickly," or "This message is important/urgent," then the wearable device may determine that the message indicates urgency, and generate the corresponding haptic output pattern. In some cases, the semantic meaning may be determined using keyword matching or matching or similarity of word definitions.

Generally, a user may define, any semantic meaning to correspond to a tactile feedback sequence. For example, a user may customize any type of tactile feedback sequence to correspond with performance of a function by the wearable device or with detection of a condition by the wearable device, and such a correspondence may be specified using "Customize" (408C).

In this example user interface, a user has options to specify "Message Recipients" (410). For example, if the "Motion Pattern" (406) includes a correspondence between a tapping pattern or motion pattern and sending a message, then using "Message Recipients" (410), a user may specify recipients to receive the message. In this example, if a message is to be sent, then "Contacts" (410A) may be used to identify or select one or more recipients, which in this case is both "Private Security" (410B) and "Important Contacts" (410C). In some examples, different combinations of message recipients may be selected.

In this way, a user may specify how the wearable device is to interpret motion data such as taps on the wearable device. Similarly, a user may specify how the wearable device is to communicate information to the user using tactile feedback sequences.

Figure 5:
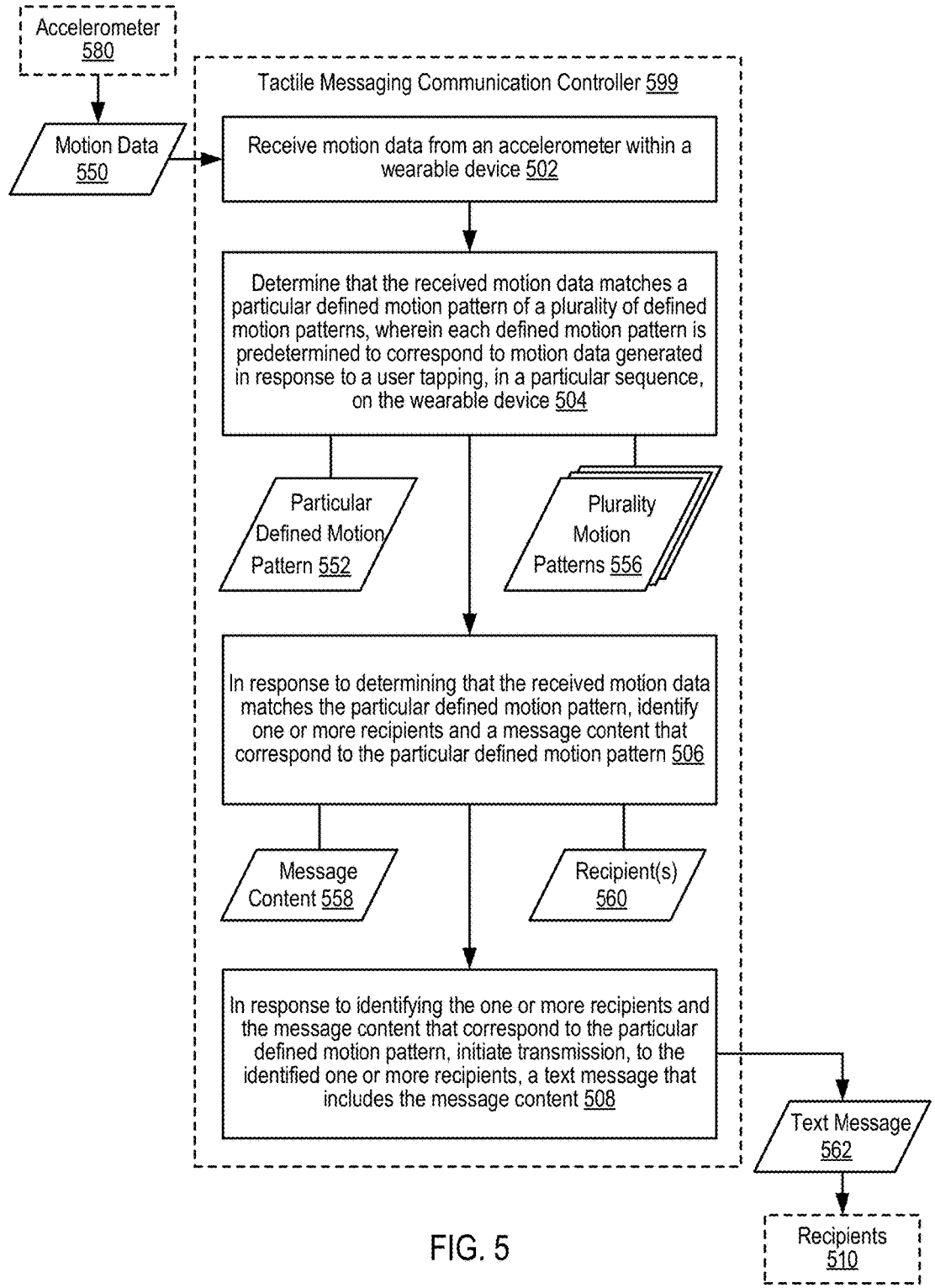
FIG. 5 sets forth a flow chart illustrating an example embodiment of a method for tactile messaging via a wearable device.

For further explanation, FIG. 5 sets forth a flow chart illustrating an example embodiment of a method for tactile messaging via a wearable device. The method of FIG. 5 includes a tactile messaging communication controller (599) receiving (502) motion data (550) from an accelerometer (580) within a wearable device. Motion data may be data describing changes in force recorded from an accelerometer or gyroscope over a given period of time. Examples of motion data may describe tapping motions provided by a user tapping on a wearable device. Receiving (502) motion data (550) from an accelerometer (580) within a wearable device may be carried out by the tactile messaging communication controller (299) receiving motion data from a sensor unit (203) transmitting motion data detected by the accelerometer (580).

The method of FIG. 5 also includes the tactile messaging communication controller (599) determining (504) that the received motion data (550) matches a particular defined motion pattern (552) of a plurality (556) of defined motion patterns. A motion pattern may be a collection of motion data that is specified to correspond to motion data generated in response to a user tapping, in a particular sequence, on the wearable device. In a particular embodiment, each defined motion pattern is predetermined to correspond to motion data generated in response to a user tapping, in a particular sequence, on the wearable device. Determining (504) that the received motion data (550) matches a particular defined motion pattern (552) of a plurality (556) of defined motion patterns may be carried out by the tactile messaging communication controller (599) analyzing the motion data from the accelerometer, and identifying portions of the motion data that correspond to a physical tap, where an analysis of the entirety of the motion data may result in the identification of a sequence of physical taps, which may be used to reference the stored plurality of defined motion patterns.

The method of FIG. 5 also includes the tactile messaging communication controller (599) in response to determining (504) that the received motion data (550) matches the particular defined motion pattern (552), identifying (506) one or more recipients (560) and a message content (558) that correspond to the particular defined motion pattern (552). A recipient may be any person, platform, or entity specified to receive messages corresponding to the particular defined motion pattern. Examples of recipients include but are not limited to people, such as people in a contacts list for the user, to entities such as a call center for emergency response providers, or platforms such as social media platforms, where a message may be made public. Message content may be any type of text media, audio media, visual media, or a combination of text, audio, and visual media. Identifying (506), in response to determining (504) that the received motion data (550) matches the particular defined motion pattern (552), one or more recipients (560) and a message content (558) that correspond to the particular defined motion pattern (552) may be carried out by the tactile messaging communication controller (599) accessing a user profile to determine the one or more recipients, the message content to send to the one or more recipients, and the particular defined motion pattern.

The method of FIG. 5 also includes the tactile messaging communication controller (599) in response to identifying (506) the one or more recipients (560) and the message content (558) that correspond to the particular defined motion pattern (552), initiating (508) transmission, to the identified one or more recipients (560), a text message (562) that includes the message content (558). Initiating (508) transmission, to the identified one or more recipients (560), a text message (562) that includes the message content (558) in response to identifying (506) the one or more recipients (560) and the message content (558) that correspond to the particular defined motion pattern (552) may be carried out by the tactile communication controller (599) instructing the network interface (224) or the RF circuitry (261) to generate the transmission, where the selection of the hardware element generating the transmission may depend on the type of communication channel associated with the one or more recipients.

For example, in some embodiments, the transmission may be to a target device that corresponds to a recipient, where the target device may be a mobile device associated with a telephone number listed as a telephone number for one of the one or more recipients of the message. Further, while in this example, a text message is transmitted, in other examples, any type of message content may be transmitted including, for example, a computerized vocalization of message content in the case that the transmission is a telephone call. In other examples, the message content may be an image, or another type of media, and the transmission may be delivered over email, Short Message Service (SMS) text, or some other communication channel or combination of communication channels.

In some embodiments, a wearable device may include capacitive sensors to detect contact from, for example, human skin. For example, a wearable device may condition the determining that the received motion data matches a particular defined motion pattern with also detecting contact with human skin. In this way, accidental jarring would not be interpreted as deliberate tapping. In other words, interpretation of motion data as tapping would occur if the capacitive sensor detected activation that coincided with the motion data.

Figure 6:
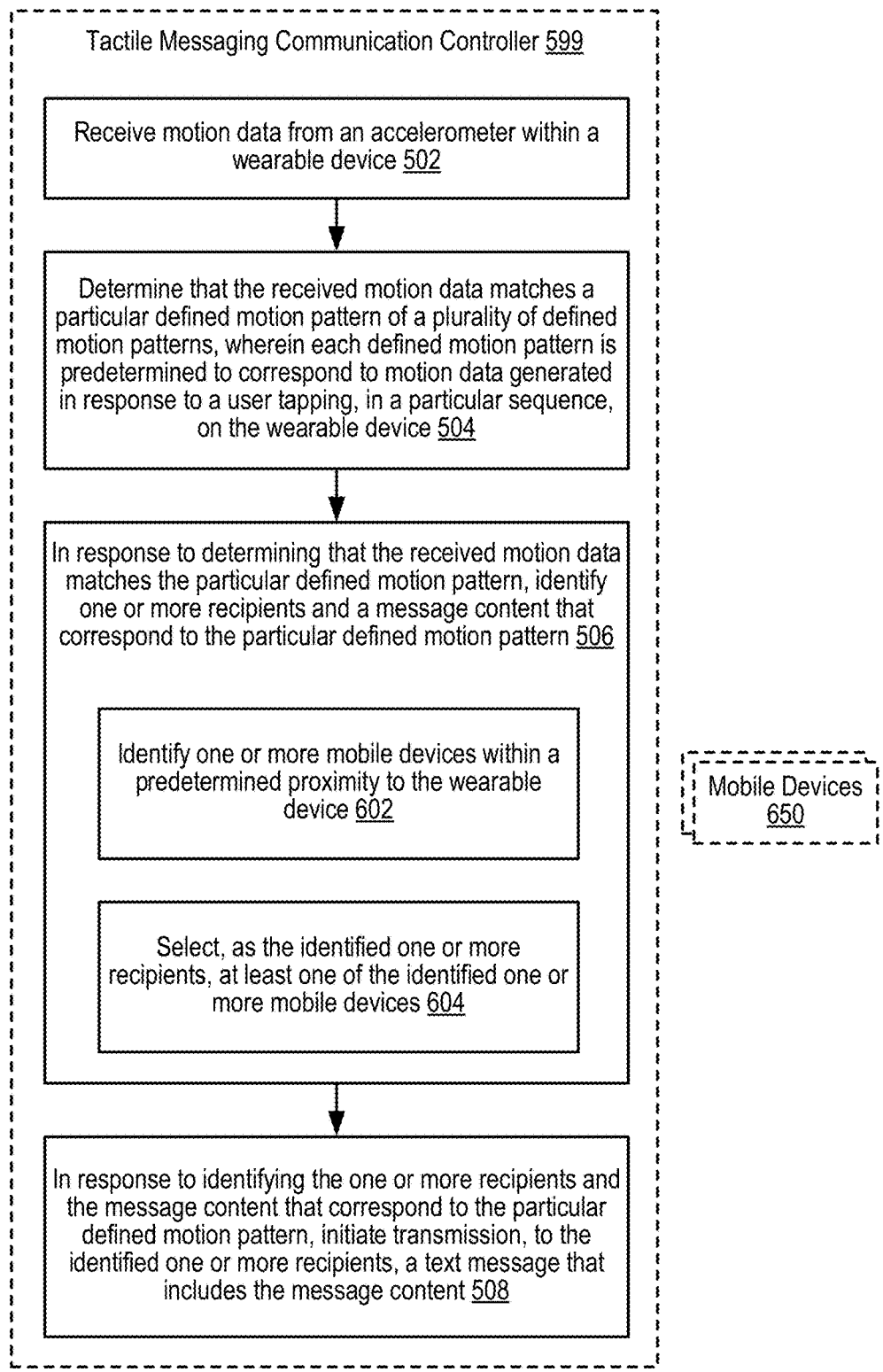
FIG. 6 sets forth a flow chart illustrating another example embodiment of a method for tactile messaging via a wearable device.

For further explanation, FIG. 6 sets forth a flow chart illustrating another example embodiment of a method for tactile messaging via a wearable device. The method of FIG. 6 is similar to the method of FIG. 5 in that the method of FIG. 6 also includes the tactile messaging communication controller (599) receiving (502) motion data (550) from an accelerometer (580) within a wearable device; determining (504) that the received motion data (550) matches a particular defined motion pattern (552) of a plurality (556) of defined motion patterns; in response to determining (504) that the received motion data (550) matches the particular defined motion pattern (552), identifying (506) one or more recipients (560) and a message content (558) that correspond to the particular defined motion pattern (552); and in response to identifying (506) the one or more recipients (560) and the message content (558) that correspond to the particular defined motion pattern (552), initiating (508) transmission, to the identified one or more recipients (560), a text message (562) that includes the message content (558).

In the example of FIG. 6, identifying (506) one or more recipients (560) and a message content (558) that correspond to the particular defined motion pattern (552) includes identifying (602) one or more mobile devices (650) within a predetermined proximity to the wearable device. Identifying (602) one or more mobile devices (650) within a predetermined proximity to the wearable device may be carried out by the tactile messaging communication controller (599) receiving proximity data from the one or more devices (650).

In the example of FIG. 6, identifying (506) one or more recipients (560) and a message content (558) that correspond to the particular defined motion pattern (552) also includes selecting (604), as the identified one or more recipients (560), at least one of the identified one or more mobile devices (650). Selecting (604), as the identified one or more recipients (560), at least one of the identified one or more mobile devices (650) may be carried out by the tactile messaging communication controller (599) accessing user profile data, where the proximity may be specified within settings in which a user may specify that a mobile device for a contact, or specified recipient of a message or message type, may be considered to be within proximity if the mobile device is determined to be within a threshold distance of the wearable device (102).

Figure 7:
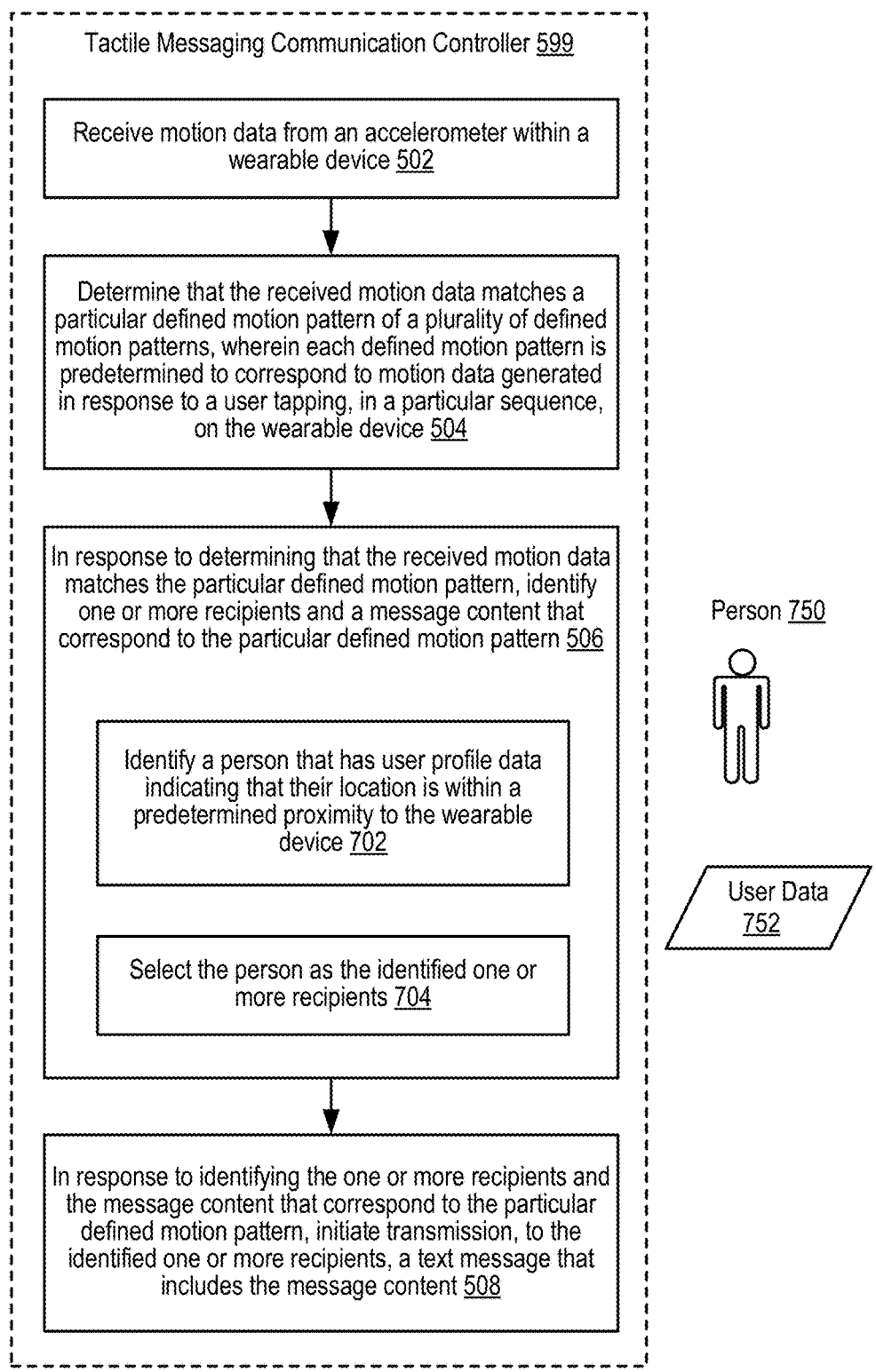
FIG. 7 sets forth a flow chart illustrating another example embodiment of a method for tactile messaging via a wearable device.

For further explanation, FIG. 7 sets forth a flow chart illustrating another example embodiment of a method for tactile messaging via a wearable device. The method of FIG. 7 is similar to the method of FIG. 5 in that the method of FIG. 7 also includes the tactile messaging communication controller (599) receiving (502) motion data (550) from an accelerometer (580) within a wearable device; determining (504) that the received motion data (550) matches a particular defined motion pattern (552) of a plurality (556) of defined motion patterns; in response to determining (504) that the received motion data (550) matches the particular defined motion pattern (552), identifying (506) one or more recipients (560) and a message content (558) that correspond to the particular defined motion pattern (552); and in response to identifying (506) the one or more recipients (560) and the message content (558) that correspond to the particular defined motion pattern (552), initiating (508) transmission, to the identified one or more recipients (560), a text message (562) that includes the message content (558).

In the example of FIG. 7, identifying (506) one or more recipients (560) and a message content (558) that correspond to the particular defined motion pattern (552) includes identifying (702) a person (750) that has user profile data (752) indicating that their location is within a predetermined proximity to the wearable device. Identifying (702) a person (750) that has user profile data (752) indicating that their location is within a predetermined proximity to the wearable device may be carried out by the tactile messaging communication controller (599) accessing and analyzing social media content or updates indicating a location for the person. For example, if the person posted a Twitter™ tweet indicating a location, or if the person posted a Facebook™ post indicating a location, or both, then the tactile messaging communication controller (599) may determine a location for the person based on these social media postings. In other examples, other sources of social media information for the user may be accessed and analyzed in order to identify a person as a recipient.

In the example of FIG. 7, identifying (506) one or more recipients (560) and a message content (558) that correspond to the particular defined motion pattern (552) includes selecting (704) the person (750) as the identified one or more recipients (560). Selecting (704) the person (750) as the identified one or more recipients (560) may be carried out by the tactile messaging communication controller (599) using the proximity data.

Figure 8:
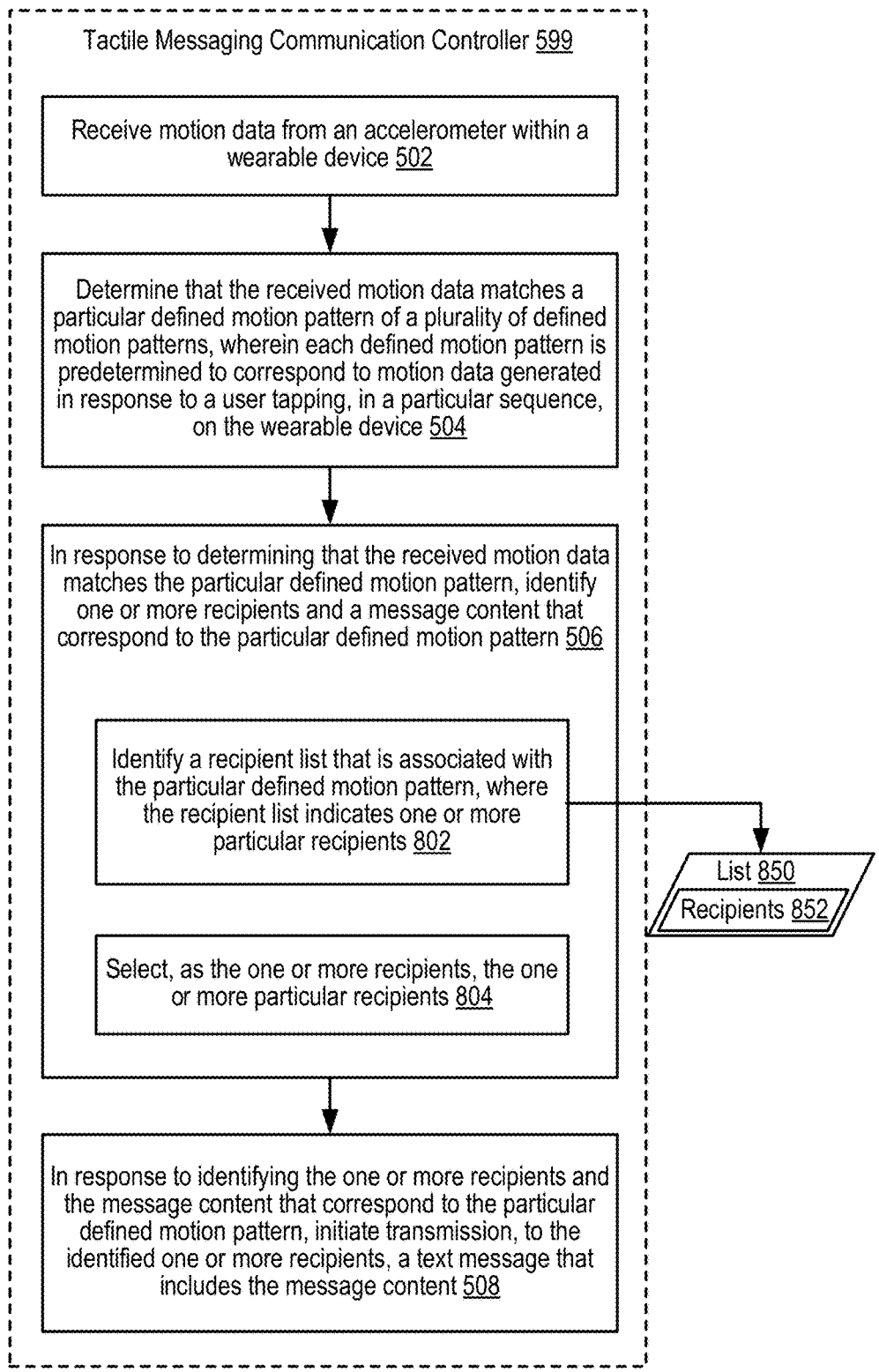
FIG. 8 sets forth a flow chart illustrating another example embodiment of a method for tactile messaging via a wearable device.

For further explanation, FIG. 8 sets forth a flow chart illustrating another example embodiment of a method for tactile messaging via a wearable device. The method of FIG. 8 is similar to the method of FIG. 5 in that the method of FIG. 8 also includes the tactile messaging communication controller (599) receiving (502) motion data (550) from an accelerometer (580) within a wearable device; determining (504) that the received motion data (550) matches a particular defined motion pattern (552) of a plurality (556) of defined motion patterns; in response to determining (504) that the received motion data (550) matches the particular defined motion pattern (552), identifying (506) one or more recipients (560) and a message content (558) that correspond to the particular defined motion pattern (552); and in response to identifying (506) the one or more recipients (560) and the message content (558) that correspond to the particular defined motion pattern (552), initiating (508) transmission, to the identified one or more recipients (560), a text message (562) that includes the message content (558).

In the example of FIG. 8, identifying (506) one or more recipients (560) and a message content (558) that correspond to the particular defined motion pattern (552) includes identifying (802) a recipient list (850) that is associated with the particular defined motion pattern (552). In a particular embodiment, the recipient list (850) indicates one or more particular recipients (852). Identifying (802) a recipient list (850) that is associated with the particular defined motion pattern (552) may be carried out by the tactile messaging communication controller (599) accessing user profile data specifying associations between motion patterns and recipients.

In the example of FIG. 8, identifying (506) one or more recipients (560) and a message content (558) that correspond to the particular defined motion pattern (552) includes selecting (804), as the identified one or more recipients (560), the one or more particular recipients (852). Selecting (804), as the identified one or more recipients (560), the one or more particular recipients (852) may be carried out by the tactile messaging communication controller (599) utilizing a database that includes entries where each entry maps a defined motion pattern to one or more recipients and a message content. In some embodiments, the recipient or recipients may be included in a user configurable recipient list that may include a plurality of recipients, and where initiating the transmission may also include initiating transmission to one or more target devices associated with the recipients in the recipient list. In some cases, the message contents to the different recipients may be user configurable. In this example, the user may select which recipients and which message content is paired with a particular defined motion pattern.

Figure 9:
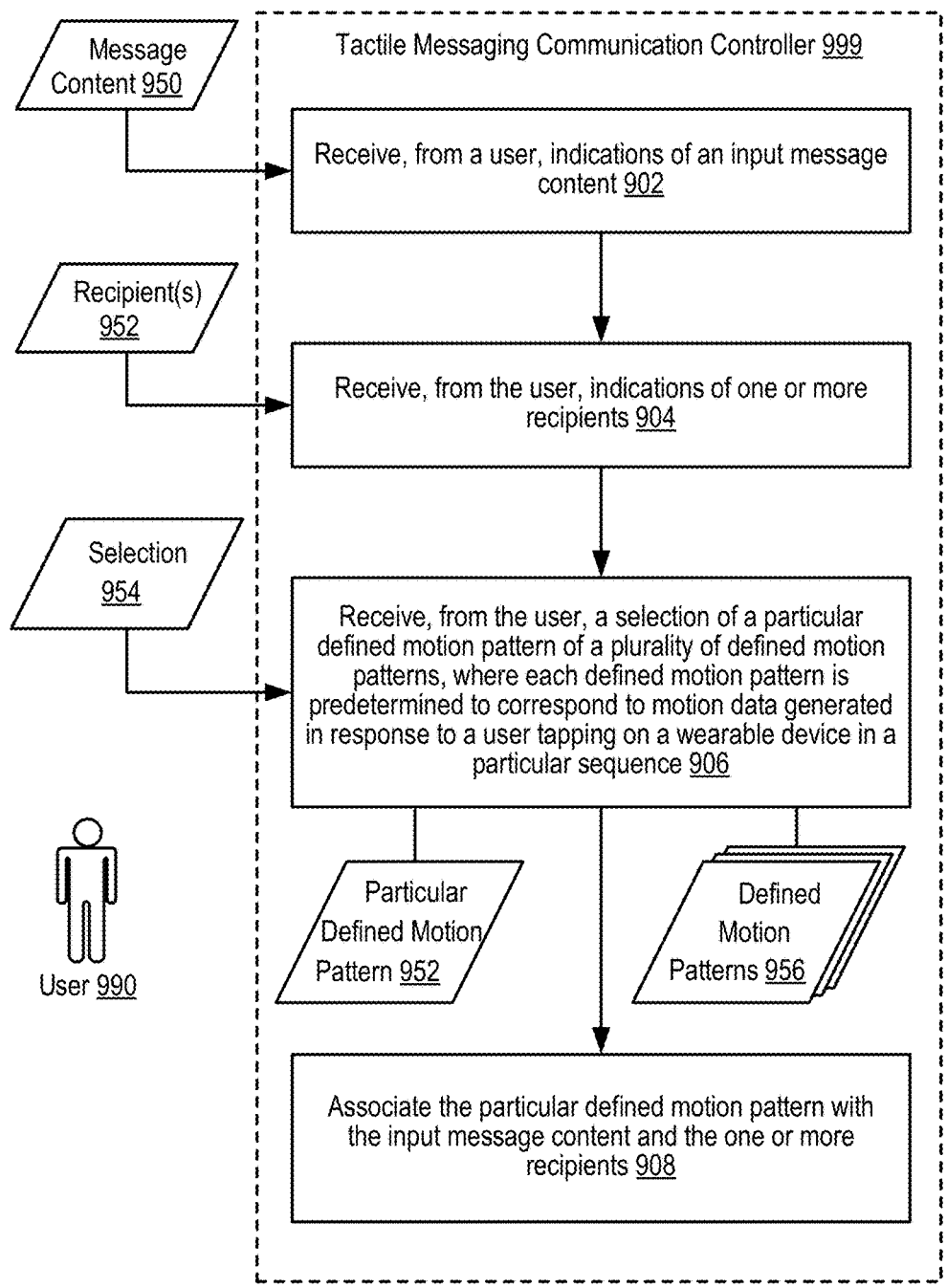
FIG. 9 sets forth a flow chart illustrating another example embodiment of a method for tactile messaging via a wearable device.

For further explanation, FIG. 9 sets forth a flow chart illustrating another example embodiment of a method for tactile messaging via a wearable device. The method of FIG. 9 includes a tactile messaging communication controller (999) receiving (902), from a user (990), indications of an input message content (950). Receiving (902), from a user (990), indications of an input message content (950) may be carried out by the tactile messaging communication controller (999) detecting a selection or entry of information using the "Wearable Device Configuration" user interface discussed in FIG. 4. For example, a user may utilize a graphical user interface (GUI) to enter one or more selections.

The method of FIG. 9 also includes the tactile messaging communication controller (999) receiving (904), from the user (990), indications of one or more recipients (952). Receiving (904), from the user (990), indications of one or more recipients (952) may be carried out by the messaging communication controller (999) detecting a selection or entry of information using a graphical user interface, such as for example, the "Wearable Device Configuration" user interface discussed in FIG. 4.

The method of FIG. 9 also includes the tactile messaging communication controller (999) receiving (906) from the user (990), a selection (954) of a particular defined motion pattern (952) of a plurality (956) of defined motion patterns. Receiving (906) from the user (990), a selection (954) of a particular defined motion pattern (952) of a plurality (956) of defined motion patterns may be carried out by the messaging communication controller (999) detecting a selection or entry of information using a graphical user interface, such as for example, the "Wearable Device Configuration" user interface discussed in FIG. 4. In a particular embodiment, each defined motion pattern is predetermined to correspond to motion data generated in response to tapping, on the wearable device, in a particular sequence.

The method of FIG. 9 also includes the tactile messaging communication controller (999) associating (908) the particular defined motion pattern (952) with the input message content (950) and the one or more recipients (952). Associating (908) the particular defined motion pattern (952) with the input message content (950) and the one or more recipients (952) may be carried out by the tactile messaging communication controller (999) generating and storing an association between a particular defined motion pattern, input message content, and one or more recipients, for example, within a data object of a user profile, where the user profile may be referenced in processing motion data. In a particular embodiment, the user may indicate a desire to associate a particular defined motion pattern with an input message content and one or more recipients. In another embodiment, the tactile messaging communication controller may automatically associate the particular defined motion pattern with an input message content and one or more recipients.

Figure 10:
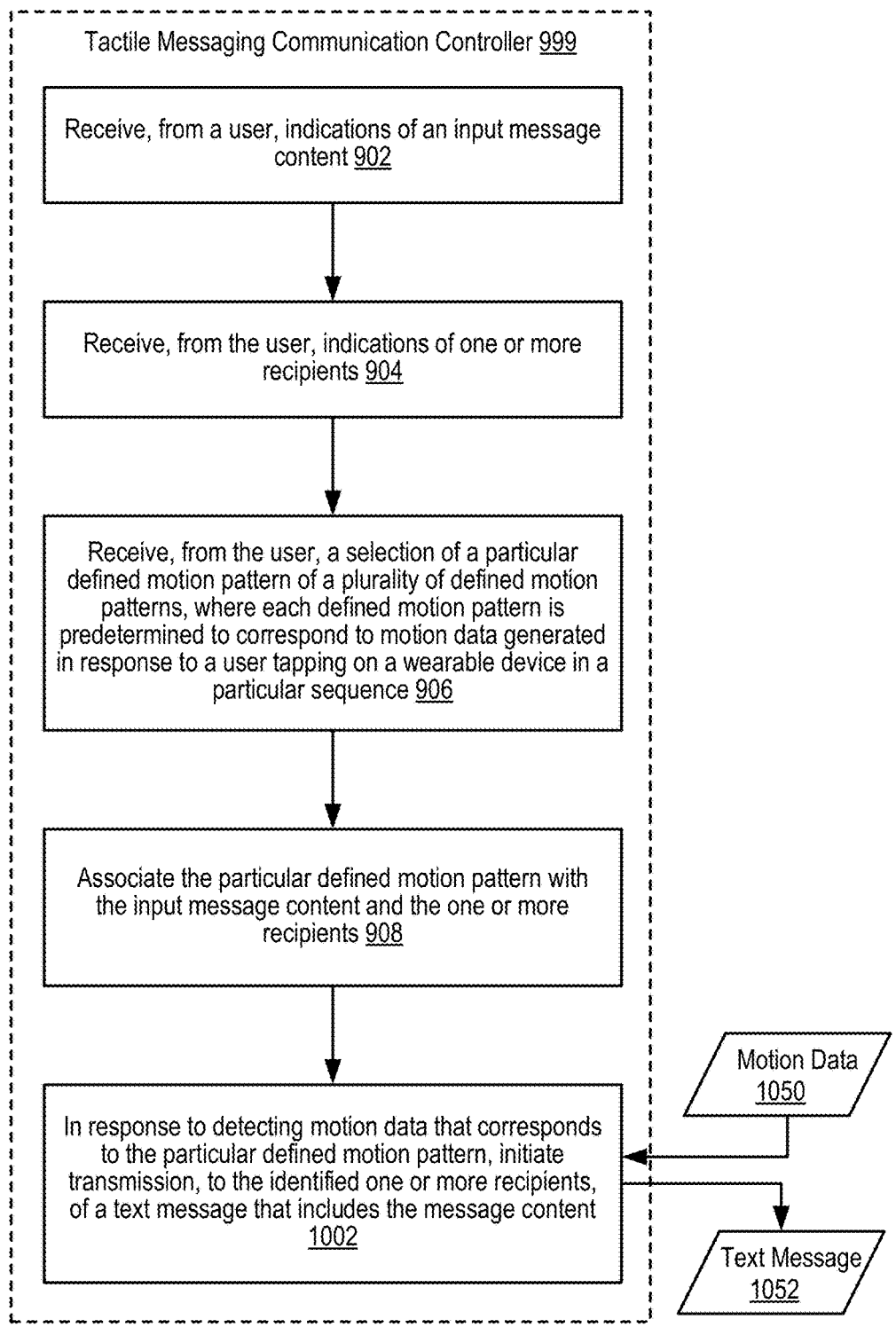
FIG. 10 sets forth a flow chart illustrating another example embodiment of a method for tactile messaging via a wearable device.

For further explanation, FIG. 10 sets forth a flow chart illustrating another example embodiment of a method for tactile messaging via a wearable device. The method of FIG. 10 is similar to the method of FIG. 9 in that the method of FIG. 10 also includes the tactile messaging communication controller (999) receiving (902), from a user (990), indications of an input message content (950); receiving (904), from the user (990), indications of one or more recipients (952); receiving (906) from the user (990), a selection (954) of a particular defined motion pattern (952) of a plurality (956) of defined motion patterns; and associating (908) the particular defined motion pattern (952) with the input message content (950) and the one or more recipients (952).

The method of FIG. 10, however, also includes the tactile messaging communication controller (999) initiating transmission (1002), in response to detecting motion data (1050) that corresponds to the particular defined motion pattern (952), to the identified one or more recipients (952), of a text message (1052) that includes the message content (950). Initiating transmission (1002), in response to detecting motion data (1050) that corresponds to the particular defined motion pattern (952), to the identified one or more recipients (952), of a text message (1052) that includes the message content (950) may be carried out by the messaging communication controller (999) instructing the network interface (224) or the RF circuitry (261) to generate the transmission, where the selection of the hardware element generating the transmission may depend on the type of communication channel associated with the one or more recipients.

Figure 11:
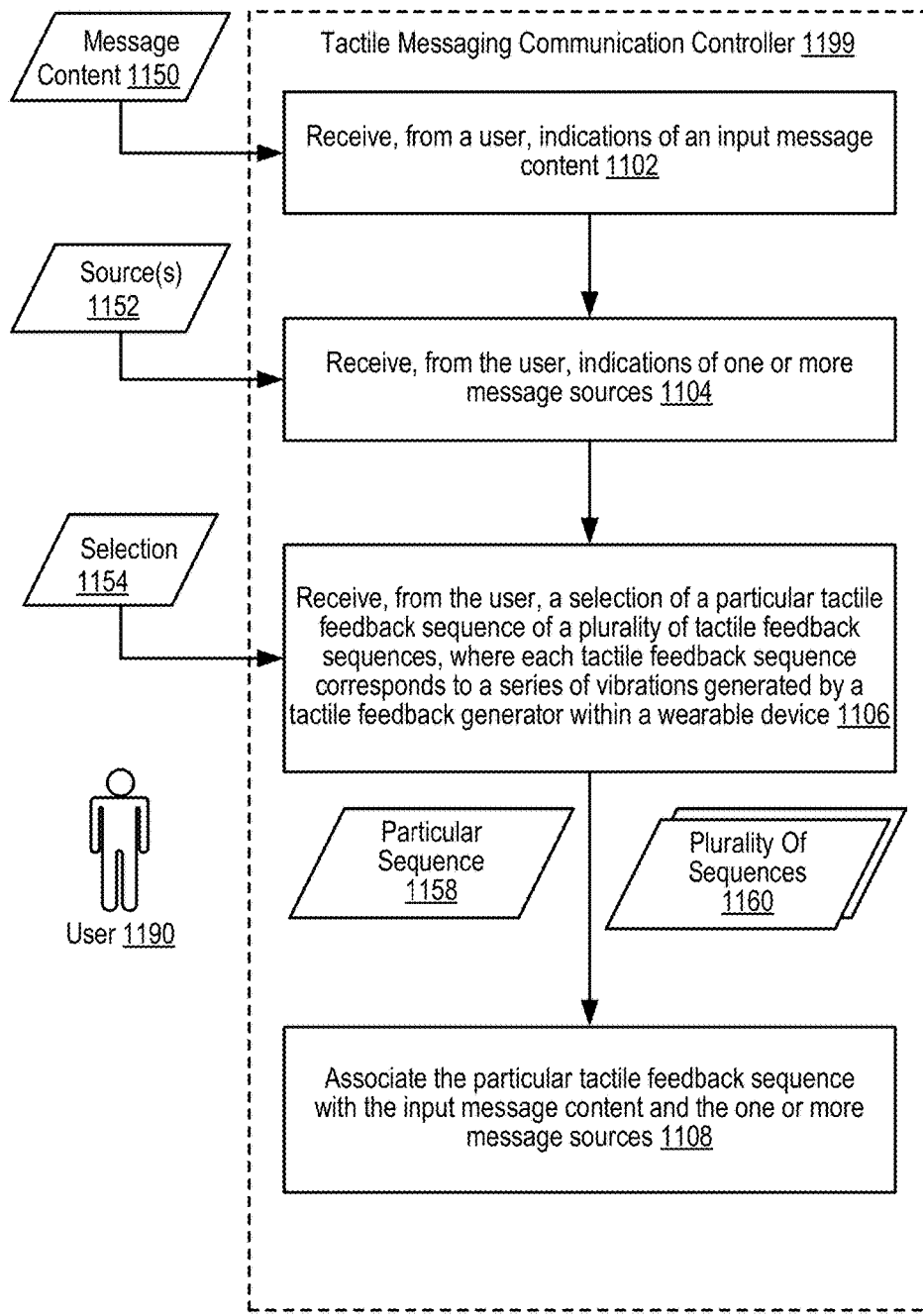
FIG. 11 sets forth a flow chart illustrating another example embodiment of a method for tactile messaging via a wearable device.

For further explanation, FIG. 11 sets forth a flow chart illustrating another example embodiment of a method for tactile messaging via a wearable device. The method of FIG. 11 includes a tactile messaging communication controller (1099) receiving (1102) from a user (1190), indications of an input message content (1150). Receiving (1102) from a user (1190), indications of an input message content (1150) may be carried out by the tactile messaging communication controller (1199) detecting a selection or entry of information using a graphical user interface, such as for example, the "Wearable Device Configuration" user interface discussed in FIG. 4.

The method of FIG. 11 also includes the tactile messaging communication controller (1099) receiving (1104) from the user (1190), indications of one or more message sources (1152). Receiving (1104) from the user (1190), indications of one or more message sources (1152) may be carried out by the tactile messaging communication controller (1199) detecting a selection or entry of information using a graphical user interface, such as for example, the "Wearable Device Configuration" user interface discussed in FIG. 4.

The method of FIG. 11 also includes the tactile messaging communication controller (1099) receiving (1104) from the user (1190), a selection (1154) of a particular tactile feedback sequence (1158) of a plurality (1160) of tactile feedback sequences. In a particular embodiment, each tactile feedback sequence corresponds to a series of vibrations generated by a tactile feedback generator within a wearable device. Receiving (1104) from the user (1190), a selection (1154) of a particular tactile feedback sequence (1158) of a plurality (1160) of tactile feedback sequences may be carried out by the tactile messaging communication controller (1199) detecting a selection or entry of information using a graphical user interface, such as for example, the "Wearable Device Configuration" user interface discussed in FIG. 4.

The method of FIG. 11 also includes the tactile messaging communication controller (1099) associating (1108) the particular tactile feedback sequence (1158) with the input message content (1150) and the one or more message sources (1152). Associating (1108) the particular tactile feedback sequence (1158) with the input message content (1150) and the one or more message sources (1152) may be carried out by the tactile messaging communication controller (1199) generating and storing an association between a particular tactile feedback sequence, input message content, and one or more message sources, for example, within a data object of a user profile.

In some embodiments, indications of message content may be specified using the user interface described above with regard to FIG. 4, where a user may specify message content using a submenu option indicated by "Send Message" (406D), depicted as (406E). Further, in some examples, the particular tactile feedback sequence may be indicated using the "Tactile Feedback Sequence" (408) menu option, which provides options for what action the tactile messaging communication controller (1199) may take in response to particular tactile feedback sequences. Similarly, in this example, the user may specify one or more sources of a message using a "Message Sources" menu option (not shown).

Figure 12:
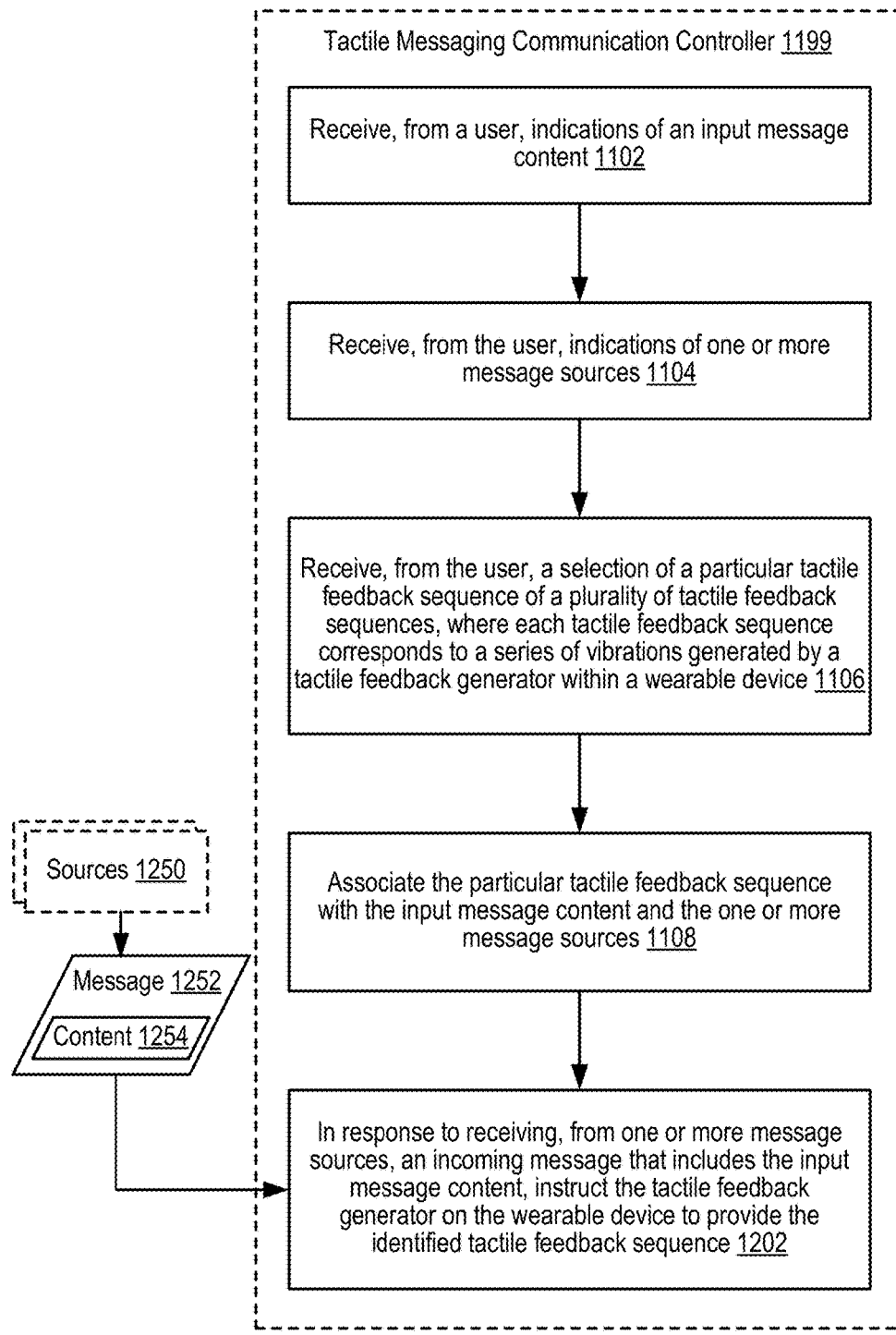
FIG. 12 sets forth a flow chart illustrating another example embodiment of a method for tactile messaging via a wearable device.

For further explanation, FIG. 12 sets forth a flow chart illustrating another example embodiment of a method for tactile messaging via a wearable device. The method of FIG. 12 is similar to the method of FIG. 11 in that the method of FIG. 12 also includes the tactile messaging communication controller (1199) receiving (1102) from a user (1190), indications of an input message content (1150); receiving (1104) from the user (1190), indications of one or more message sources (1152); receiving (1104) from the user (1190), a selection (1154) of a particular tactile feedback sequence (1158) of a plurality (1160) of tactile feedback sequences; and associating (1108) the particular tactile feedback sequence (1158) with the input message content (1150) and the one or more message sources (1152).

The method of FIG. 12, however, also includes the tactile messaging communication controller (1199) in response to receiving, from the one or more message sources (1250), an incoming message (1252) that includes the input message content (1150), instructing (1202) the tactile feedback generator (1260) on the wearable device to provide the particular tactile feedback sequence (1158). Instructing (1202) the tactile feedback generator (1260) on the wearable device to provide the particular tactile feedback sequence (1158) in response to receiving, from the one or more message sources (1250), an incoming message (1252) that includes the input message content (1150) may be carried out by the tactile messaging communication controller (1199) sending one or more commands to a tactile feedback generator (382) to produce vibrations that correspond to the particular tactile feedback sequence (1158).

Figure 13:
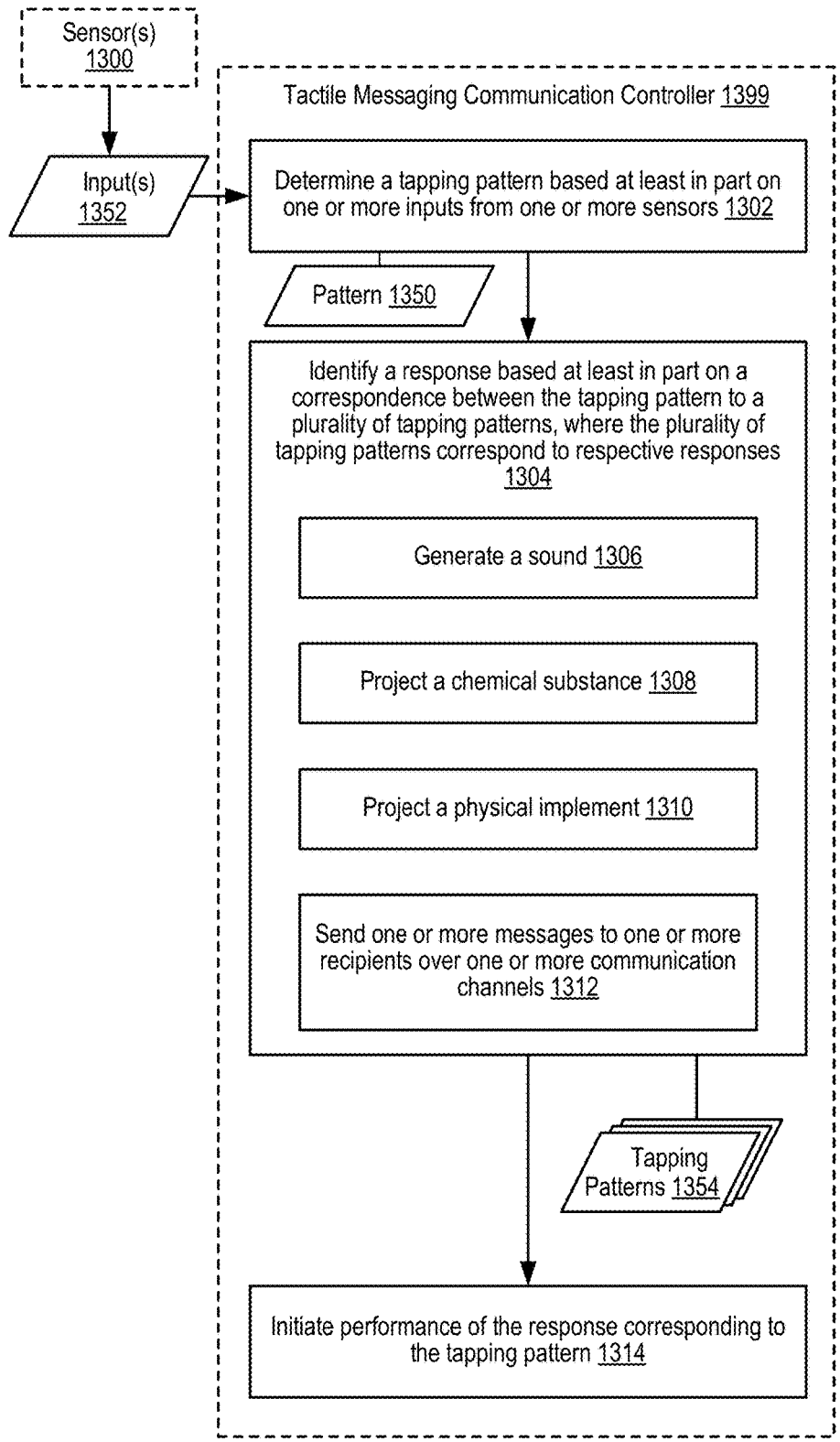
FIG. 13 sets forth a flow chart illustrating another example embodiment of a method for tactile messaging via a wearable device.

For further explanation, FIG. 13 sets forth a flow chart illustrating another example embodiment of a method for tactile messaging via a wearable device. The method of FIG. 13 includes a tactile messaging communication controller (1399) determining (1302) a tapping pattern (1350) based at least in part on one or more inputs (1352) from one or more sensors (1300). Determining (1302) a tapping pattern (1350) based at least in part on one or more inputs (1352) from one or more sensors (1300) may be carried out by the tactile messaging communication controller (1399) analyzing the one or more inputs (1352) and identifying portions that correspond to a physical tap, where an analysis of the entirety of the one or more inputs (1352) may result in the identification of a sequence of physical taps, which may be used to identify a tapping pattern.

The method of FIG. 13 also includes the tactile messaging communication controller (1399) identifying (1304) a response based at least in part on a correspondence between the tapping pattern (1350) to one of a plurality (1354) of tapping patterns. Identifying (1304) a response based at least in part on a correspondence between the tapping pattern (1350) to one of a plurality (1354) of tapping patterns may be carried out by the tactile messaging communication controller (1399) accessing a user profile to determine associations between responses and tapping patterns.

In a particular embodiment, identifying (1304) the response includes at least one of: generating a sound (1306), projecting (1308) a chemical substance, projecting (1310) a physical implement, and sending (1312) one or more messages to one or more recipients over one or more communication channels. In a particular embodiment, each respective responses of the plurality of responses are mapped to respective tapping patterns. In a particular embodiment, the plurality (1354) of tapping patterns corresponds to respective responses.

The method of FIG. 13 also includes the tactile messaging communication controller (1399) initiating (1314) performance of the response corresponding to the tapping pattern (1350). Initiating (1314) performance of the response corresponding to the tapping pattern (1350) may be carried out by the tactile messaging communication controller (1399) determining instructions to hardware elements of a wearable device that correspond with performance of the response, for example, the sound generated may be an alarm, a siren, or a recorded message indicating distress, and the sound may be generated using the speaker (384) incorporated within a wearable device; the physical implement may be a projectile (391) as depicted in FIG. 3, where the projectile may be stored within the chamber (390) of the wearable device. In this way, for example, a wearable device may serve as a defensive device, where the projectile may be a type of barb intended to incapacitate or at least momentarily disturb or disrupt an attacker.

Figure 14:
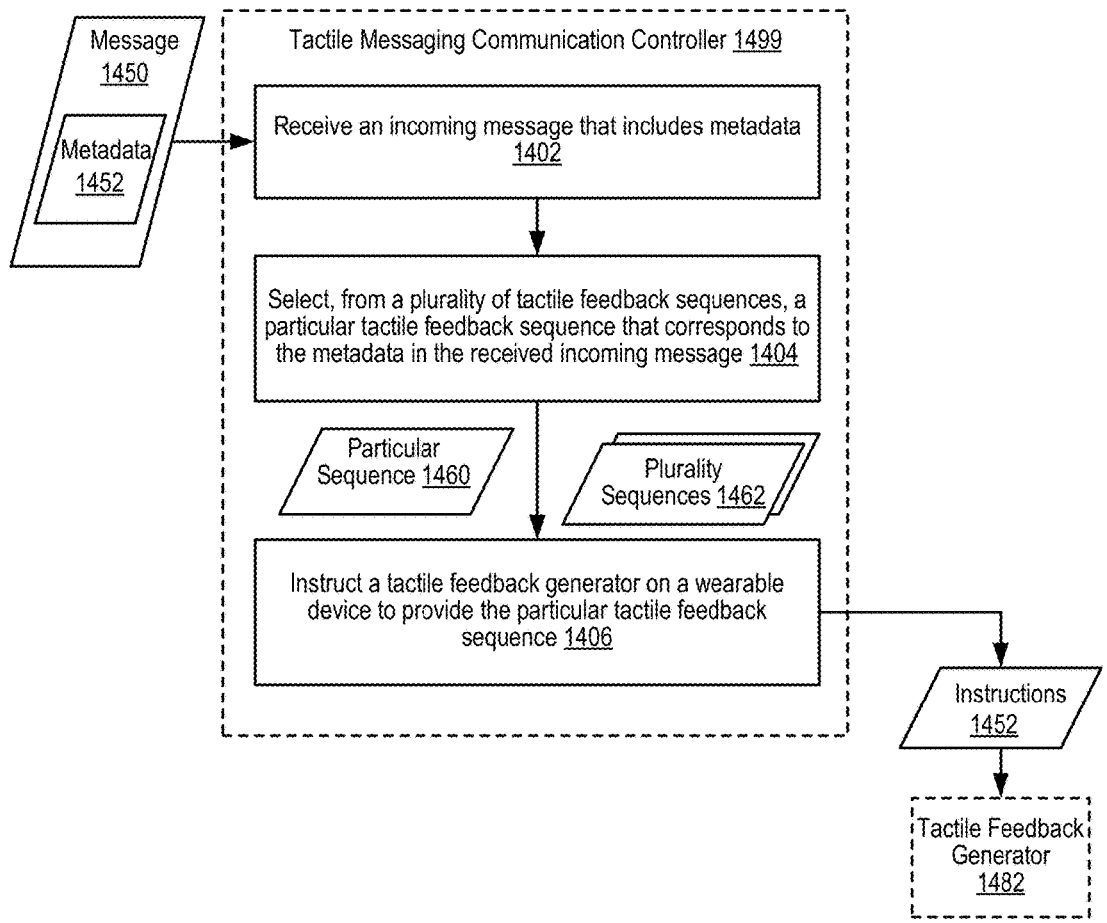
FIG. 14 sets forth a flow chart illustrating another example embodiment of a method for tactile messaging via a wearable device.

For further explanation, FIG. 14 sets forth a flow chart illustrating another example embodiment of a method for tactile messaging via a wearable device. The method of FIG. 14 includes a tactile messaging communication controller (1499) receiving (1402) an incoming message (1450) that includes metadata (1452). Receiving (1402) an incoming message (1450) that includes metadata (1452) may be carried out by the tactile communications controller (1499) receiving data from the network interface (224) or the RF circuitry (261).

The method of FIG. 14 also includes the tactile messaging communication controller (1499) selecting (1404), from a plurality (1462) of tactile feedback sequences, a particular tactile feedback sequence (1460) that corresponds to the metadata (1452) in the received incoming message (1450). Selecting (1404), from a plurality (1462) of tactile feedback sequences, a particular tactile feedback sequence (1460) that corresponds to the metadata (1452) in the received incoming message (1450) may be carried out by the tactile communications controller (1499) utilizing a database to find an entry that matches the information in the metadata where the entry maps the information in the metadata to the particular tactile feedback sequence.

The method of FIG. 14 also includes the tactile messaging communication controller (1499) instructing (1406) a tactile feedback generator (1482) on the wearable device to provide the particular tactile feedback sequence (1460). Instructing (1406) a tactile feedback generator (1482) on the wearable device to provide the particular tactile feedback sequence (1460) may be carried out by the tactile communications controller (1499) sending one or more commands to the tactile feedback generator (1482) to generate physical vibrations according to the particular tactile feedback sequence.

Figure 15:
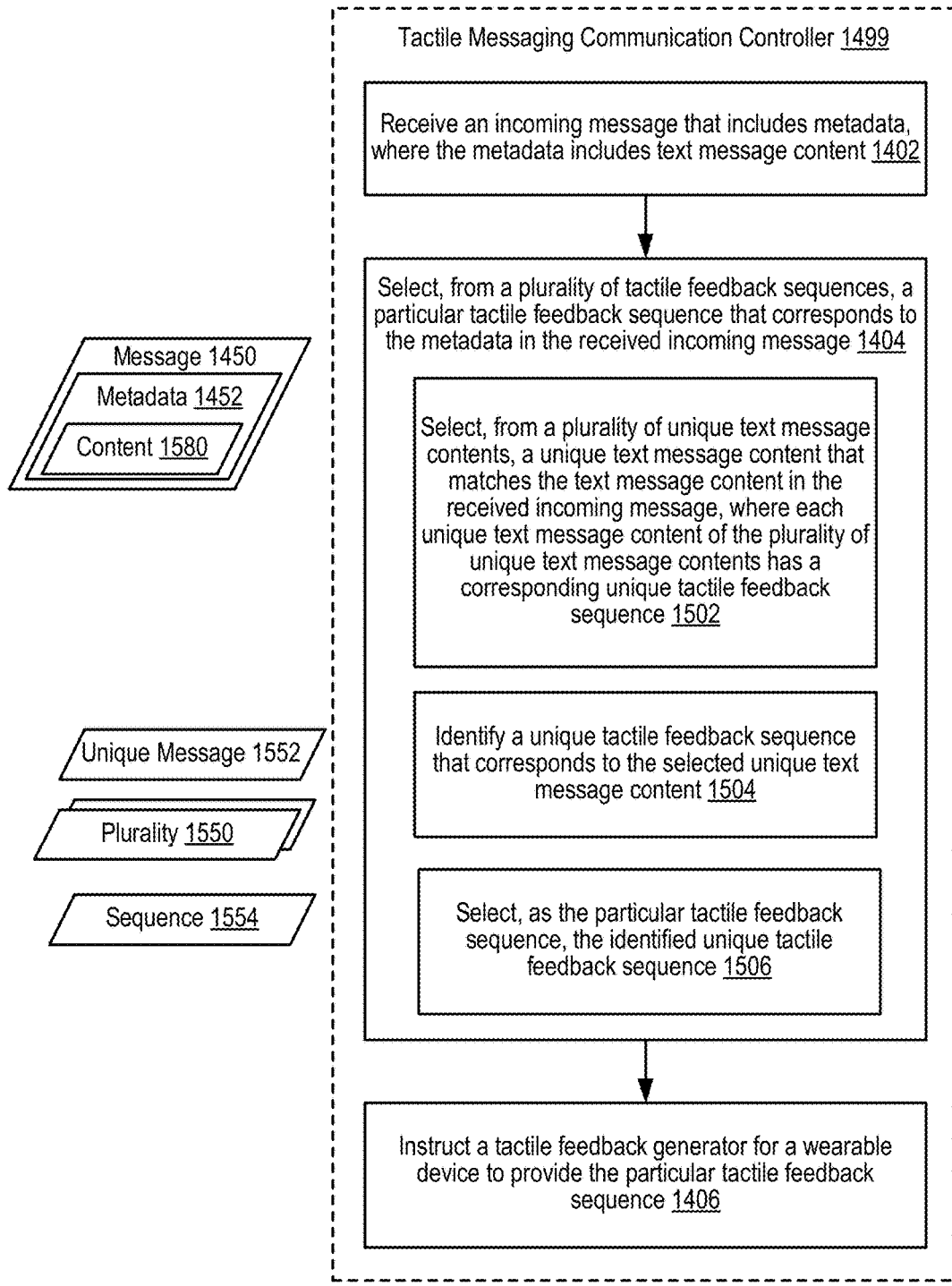
FIG. 15 sets forth a flow chart illustrating another example embodiment of a method for tactile messaging via a wearable device.

For further explanation, FIG. 15 sets forth a flow chart illustrating another example embodiment of a method for tactile messaging via a wearable device. The method of FIG. 15 is similar to the method of FIG. 14 in that the method of FIG. 15 also includes the tactile messaging communication controller (1499) receiving (1402) an incoming message (1450) that includes metadata (1452); selecting (1404), from a plurality (1462) of tactile feedback sequences, a particular tactile feedback sequence (1460) that corresponds to the metadata (1452) in the received incoming message (1450); and instructing (1406) a tactile feedback generator (1482) on the wearable device to provide the particular tactile feedback sequence (1460).

In the example of FIG. 15, the metadata (1452) may indicate different types of information, including proximity data, semantic information about the content of the message, or more generally, any type of information regarding the message.

In the example of FIG. 15, selecting (1404), from a plurality (1462) of tactile feedback sequences, a particular tactile feedback sequence (1460) that corresponds to the metadata (1452) in the received incoming message (1450) includes selecting (1502), from a plurality (1550) of unique text message contents, a unique text message content (1552) that matches the text message content (1580) in the received incoming message (1450). In a particular embodiment, each unique text message content of the plurality of unique text message contents has a corresponding unique tactile feedback sequence. Selecting (1502), from a plurality (1550) of unique text message contents, a unique text message content (1552) that matches the text message content (1580) in the received incoming message (1450) may be carried out by the tactile messaging communications controller (1499) accessing user profile data specifying associations between text message content and incoming messages.

In the example of FIG. 15, selecting (1404), from a plurality (1462) of tactile feedback sequences, a particular tactile feedback sequence (1460) that corresponds to the metadata (1452) in the received incoming message (1450) includes identifying (1504) a unique tactile feedback sequence (1554) that corresponds to the selected unique text message content (1552). Identifying (1504) a unique tactile feedback sequence (1554) that corresponds to the selected unique text message content (1552) may be carried out by the tactile messaging communications controller (1499) accessing user profile data specifying associations between tactile feedback sequences and text message contents.

In the example of FIG. 15, selecting (1404), from a plurality (1462) of tactile feedback sequences, a particular tactile feedback sequence (1460) that corresponds to the metadata (1452) in the received incoming message (1450) includes selecting (1506), as the particular tactile feedback sequence (1460), the identified unique tactile feedback sequence (1554). Selecting (1506), as the particular tactile feedback sequence (1460), the identified unique tactile feedback sequence (1554) may be carried out by the tactile messaging communications controller (1499) identifying a code that corresponds to an identification of the identified tactile feedback sequence; and storing that code in a data storage location that is used to indicate the 'particular tactile feedback sequence.'

In some embodiments, plurality of unique text message contents may include text contents such as "I'm here," "I just left," or some other message content, and if the incoming message has text that matches one of the plurality of unique text message contents, then a wearable device may then identify the unique tactile feedback sequence to generate based on a correspondence between the unique tactile feedback sequence and the matched text message from among the plurality of unique text message contents. In some cases, matching may be based on a semantic matching, where the incoming message is parsed and analyzed to determine a semantic meaning, and the semantic meaning is used to identify a matching entry of the plurality of unique text message contents. For example, if the incoming message is "I'm on my way," then the semantic meaning of the incoming message may be matched to the "I just left" text message of the plurality of unique text message contents. In other cases, keywords from the incoming message may be matched to determine a corresponding text message of the plurality of unique text message contents.

Figure 16:
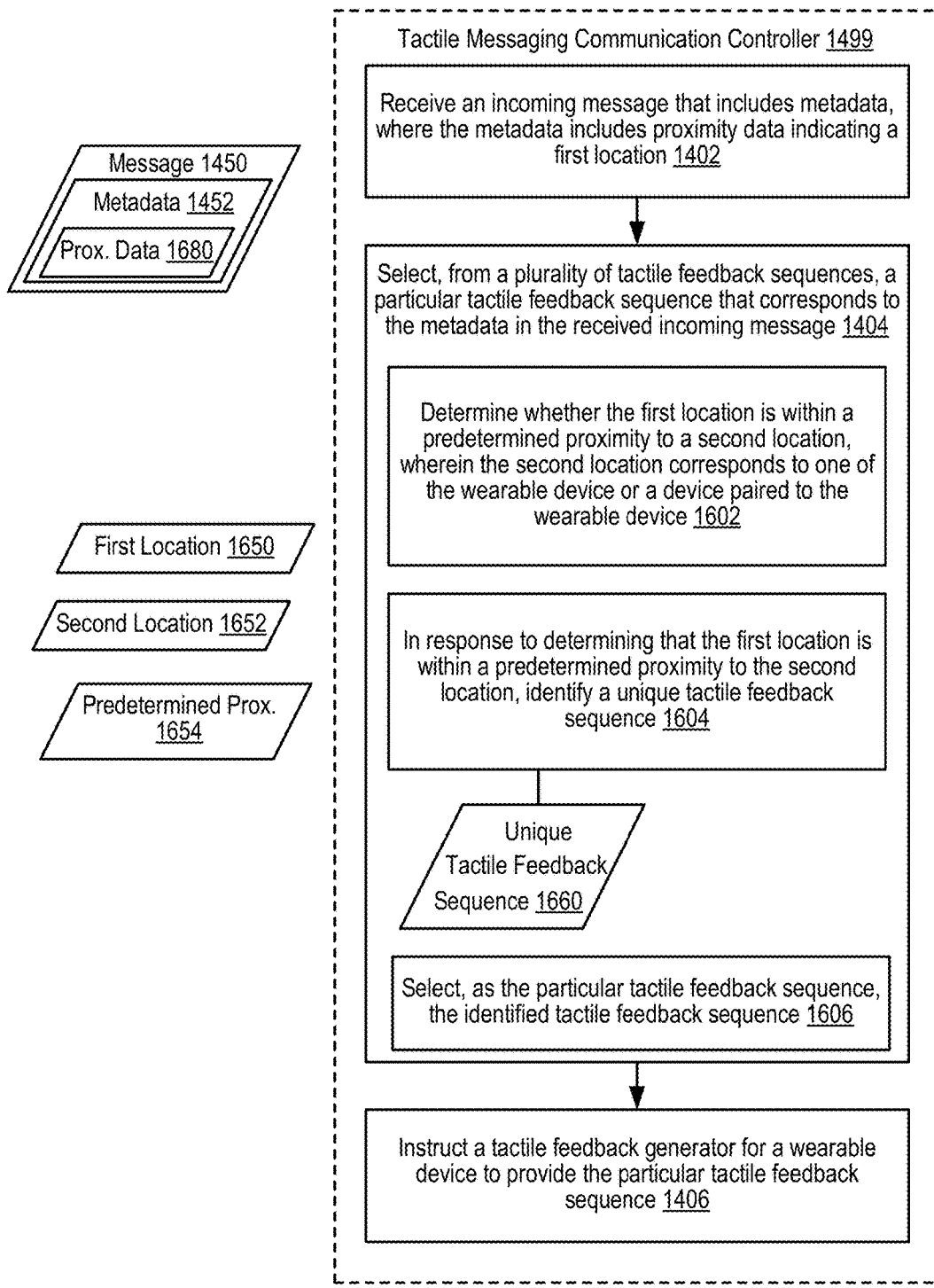
FIG. 16 sets forth a flow chart illustrating another example embodiment of a method for tactile messaging via a wearable device.

For further explanation, FIG. 16 sets forth a flow chart illustrating another example embodiment of a method for tactile messaging via a wearable device. The method of FIG. 16 is similar to the method of FIG. 14 in that the method of FIG. 16 also includes the tactile messaging communication controller (1499) receiving (1402) an incoming message (1450) that includes metadata (1452); selecting (1404), from a plurality (1462) of tactile feedback sequences, a particular tactile feedback sequence (1460) that corresponds to the metadata (1452) in the received incoming message (1450); and instructing (1406) a tactile feedback generator (1482) on the wearable device to provide the particular tactile feedback sequence (1460).

In the example of FIG. 16, the metadata (1452) may indicate different types of information, including proximity data, semantic information about the content of the message, or more generally, any type of information regarding the message.

In the example of FIG. 16, selecting (1404), from a plurality (1462) of tactile feedback sequences, a particular tactile feedback sequence (1460) that corresponds to the metadata (1452) in the received incoming message (1450) includes determining (1602) whether the first location (1650) is within a predetermined proximity (1654) to a second location (1652). In a particular embodiment, the second location (1652) corresponds to one of the wearable device or a device paired to the wearable device. Determining (1602) whether the first location (1650) is within a predetermined proximity (1654) to a second location (1652) may be carried out by the tactile messaging communications controller (1499).

In the example of FIG. 16, selecting (1404), from a plurality (1462) of tactile feedback sequences, a particular tactile feedback sequence (1460) that corresponds to the metadata (1452) in the received incoming message (1450) includes in response to determining (1602) that the first location (1650) is within the predetermined proximity (1654) to the second location (1652), identifying (1604) a unique tactile feedback sequence (1660). Identifying (1604) a unique tactile feedback sequence (1660) in response to determining (1602) that the first location (1650) is within the predetermined proximity (1654) to the second location (1652) may be carried out by the tactile messaging communications controller (1499) accessing user profile data specifying associations between measures of proximity to tactile feedback sequences.

In the example of FIG. 16, selecting (1404), from a plurality (1462) of tactile feedback sequences, a particular tactile feedback sequence (1460) that corresponds to the metadata (1452) in the received incoming message (1450) includes selecting (1606), as the particular tactile feedback sequence (1460), the identified unique tactile feedback sequence (1660). Selecting (1606), as the particular tactile feedback sequence (1460), the identified unique tactile feedback sequence (1660) may be carried out by the tactile messaging communications controller (1499) identifying a code that acts as an identified of the identified tactile feedback sequence; and storing that code in a data storage location that is used to indicate the 'particular tactile feedback sequence.'

In this way, a wearable device may indicate proximity of another device or person the closer the other device gets to the wearable device, and where the wearable device may indicate this increasing proximity with different particular tactile feedback sequences that may change as the distance between the other device and the wearable device decreases.

Figure 17:
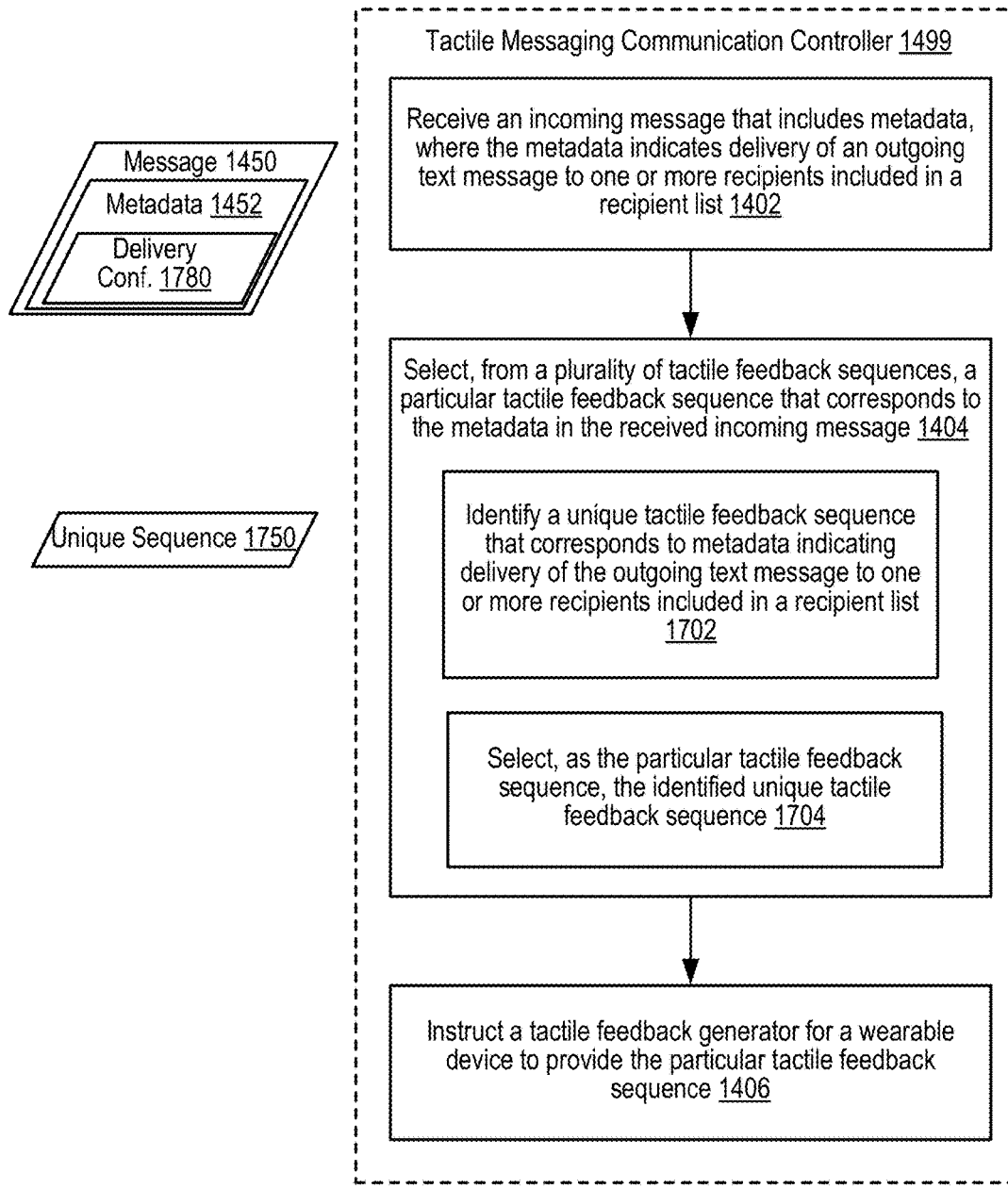
FIG. 17 sets forth a flow chart illustrating another example embodiment of a method for tactile messaging via a wearable device.

For further explanation, FIG. 17 sets forth a flow chart illustrating another example embodiment of a method for tactile messaging via a wearable device. The method of FIG. 17 is similar to the method of FIG. 14 in that the method of FIG. 17 also includes the tactile messaging communication controller (1499) receiving (1402) an incoming message (1450) that includes metadata (1452); selecting (1404), from a plurality (1462) of tactile feedback sequences, a particular tactile feedback sequence (1460) that corresponds to the metadata (1452) in the received incoming message (1450); and instructing (1406) a tactile feedback generator (1482) on the wearable device to provide the particular tactile feedback sequence (1460).

In the example of FIG. 17, the metadata (1452) indicates delivery (1780) of an outgoing text message to one or more recipients included in a recipient list.

In the example of FIG. 17, selecting (1404), from a plurality (1462) of tactile feedback sequences, a particular tactile feedback sequence (1460) that corresponds to the metadata (1452) in the received incoming message (1450) includes identifying (1702) a unique tactile feedback sequence (1750) that corresponds to metadata (1452) indicating delivery (1780) of an outgoing text message to one or more recipients included in a recipient list. Identifying (1702) a unique tactile feedback sequence (1750) that corresponds to metadata (1452) indicating delivery (1780) of an outgoing text message to one or more recipients included in a recipient list may be carried out by the tactile messaging communications controller (1499) accessing user profile data specifying associations between performance of delivery of text messages and tactile feedback sequences.

In the example of FIG. 17, selecting (1404), from a plurality (1462) of tactile feedback sequences, a particular tactile feedback sequence (1460) that corresponds to the metadata (1452) in the received incoming message (1450) includes selecting (1704), as the particular tactile feedback sequence (1460), the identified unique tactile feedback sequence (1750). Selecting (1704), as the particular tactile feedback sequence (1460), the identified unique tactile feedback sequence (1750) may be carried out by the tactile messaging communications controller (1499). In this way, the tactile feedback sequence may indicate that, for example, a distress message was delivered.

Figure 18:
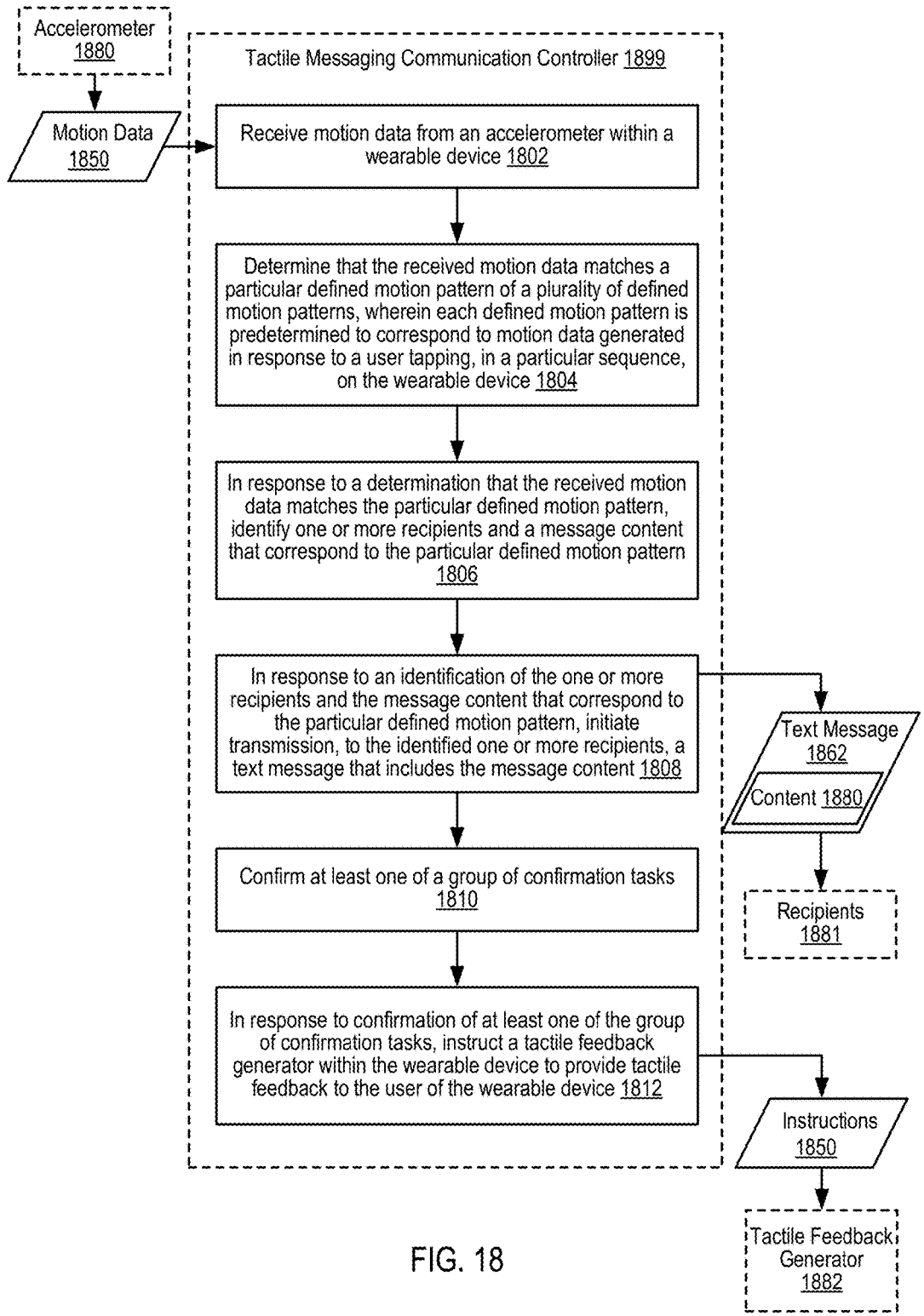
FIG. 18 sets forth a flow chart illustrating another example embodiment of a method for tactile messaging via a wearable device.

For further explanation, FIG. 18 sets forth a flow chart illustrating another example embodiment of a method for tactile messaging via a wearable device. The method of FIG. 18 includes a tactile messaging communication controller (1899) receiving (1802) motion data (1850) from an accelerometer (1880) within the wearable device. Receiving (1802) motion data (1850) from an accelerometer (1880) within the wearable device may be carried out by the tactile messaging communications controller (1899).

The method of FIG. 18 includes a tactile messaging communication controller (1899) determining (1804) that the received motion data (1850) matches a particular defined motion pattern (1870) of a plurality (1872) of defined motion patterns. Determining (1804) that the received motion data (1850) matches a particular defined motion pattern (1870) of a plurality (1872) of defined motion patterns may be carried out by the tactile messaging communications controller (1899) accessing a user profile specifying associations between motion patterns and motion patterns.

In a particular embodiment, each defined motion pattern is predetermined to correspond to motion data generated in response to a user tapping, in a particular sequence, on the wearable device.

The method of FIG. 18 includes a tactile messaging communication controller (1899) in response to determining (1804) that the received motion data (1850) matches the particular defined motion pattern (1870), identifying (1806) one or more recipients (1881) and a message content (1880) that correspond to the particular defined motion pattern (1870). Identifying (1806) one or more recipients (1881) and a message content (1880) that correspond to the particular defined motion pattern (1870) may be carried out by the tactile messaging communications controller (1899) accessing a user profile specifying associations between recipients, message contents, and motion patterns.

The method of FIG. 18 includes a tactile messaging communication controller (1899) in response to identifying (1806) the one or more recipients (1881) and the message content (1880) that correspond to the particular defined motion pattern (1870), initiating (1808) transmission, to the identified one or more recipients (1881), a text message (1862) that includes the message content (1880). Initiating (1808) transmission, to the identified one or more recipients (1881), a text message (1862) that includes the message content (1880) may be carried out by the tactile messaging communications controller (1899) communicating one or more commands to the network interface (224) or the RF circuitry (261) to generate the transmission.

The method of FIG. 18 includes a tactile messaging communication controller (1899) confirming (1810) at least one of a group of confirmation tasks. Confirming (1810) at least one of a group of confirmation tasks may be carried out the tactile messaging communications controller (1899) receiving confirmation from the network interface (224) or the RF circuitry (261) used to generate the transmission.

The method of FIG. 18 includes a tactile messaging communication controller (1899) in response to confirming (1810) at least one of the group of confirmation tasks, instructing (1812) a tactile feedback generator (1882) within the wearable device to provide tactile feedback to the user of the wearable device. Instructing (1812) a tactile feedback generator (1882) within the wearable device to provide tactile feedback to the user of the wearable device may be carried out by the tactile messaging communications controller (1899) communicating one or more commands to produce vibrations that correspond to the particular tactile feedback.

In this way, a user may tap on a wearable device in a particular tapping pattern that generates motion data, which when interpreted by the wearable device, prompts the wearable device to transmit a message. Further in this example, the user is provided a tactile feedback sequence to indicate that the message has been confirmed as delivered, thereby providing the user with some confirmation that their distress call has been delivered.

Figure 19:
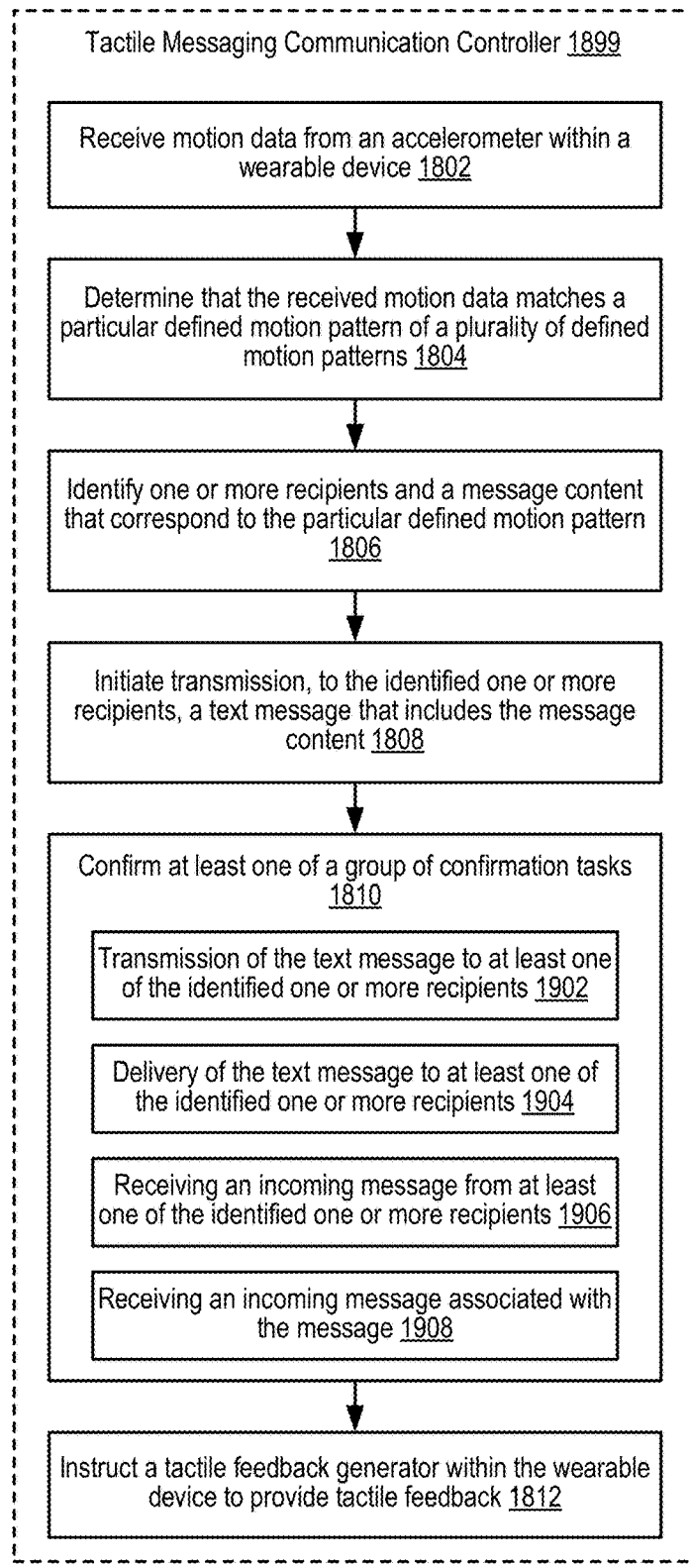
FIG. 19 sets forth a flow chart illustrating another example embodiment of a method for tactile messaging via a wearable device.

For further explanation, FIG. 19 sets forth a flow chart illustrating another example embodiment of a method for tactile messaging via a wearable device. The method of FIG. 19 is similar to the method of FIG. 18 in that the method of FIG. 19 also includes the tactile messaging communication controller (1899) receiving (1802) motion data (1850) from an accelerometer (1880) within the wearable device; determining (1804) that the received motion data (1850) matches a particular defined motion pattern (1870) of a plurality (1872) of defined motion patterns; in response to determining (1804) that the received motion data (1850) matches the particular defined motion pattern (1870), identifying (1806) one or more recipients (1881) and a message content (1880) that correspond to the particular defined motion pattern (1870); in response to identifying (1806) the one or more recipients (1881) and the message content (1880) that correspond to the particular defined motion pattern (1870), initiating (1808) transmission, to the identified one or more recipients (1881), a text message (1862) that includes the message content (1880); confirming (1810) at least one of a group of confirmation tasks; and in response to confirming (1810) at least one of the group of confirmation tasks, instructing (1812) a tactile feedback generator (1882) within the wearable device to provide tactile feedback to the user of the wearable device.

The method of FIG. 19 also includes the tactile messaging communication controller (1899) confirming (1902) transmission of the text message to at least one of the identified one or more recipients (1881). Confirming (1902) transmission of the text message to at least one of the identified one or more recipients (1881) may be carried out by the tactile messaging communication controller (1899) receiving confirmation from the network interface (224) or the RF circuitry (261) used to generate the transmission.

The method of FIG. 19 also includes the tactile messaging communication controller (1899) confirming delivery (1904) of the text message to at least one of the identified one or more recipients (1881). Confirming delivery (1904) of the text message to at least one of the identified one or more recipients (1881) may be carried out by the tactile messaging communication controller (1899).

The method of FIG. 19 also includes the tactile messaging communication controller (1899) confirming (1906) receipt of an incoming message from at least one of the identified one or more recipients (1881). Confirming (1906) receipt of an incoming message from at least one of the identified one or more recipients (1881) may be carried out by the tactile messaging communication controller (1899).

The method of FIG. 19 also includes the tactile messaging communication controller (1899) confirming (1908) receipt of an incoming message associated with the text message. Confirming (1908) receipt of an incoming message associated with the text message may be carried out by the tactile messaging communication controller (1899).

Exemplary embodiments of the present invention are described largely in the context of a fully functional computer system for tactile messaging via a wearable device. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of tactile messaging via a wearable device, the method comprising:
   by a processor of a computing device:
      receiving motion data from an accelerometer within the wearable device;
      determining that the received motion data matches a particular defined motion pattern of a plurality of defined motion patterns, wherein each defined motion pattern is predetermined to correspond to motion data generated in response to a user tapping, in a particular sequence, on the wearable device;
      in response to determining that the received motion data matches the particular defined motion pattern, identifying one or more recipients and a message content that correspond to the particular defined motion pattern including:
         analyzing a plurality of user profile data to identify a person that has user profile data indicating that their location is within a predetermined proximity to the wearable device; and
         selecting the person as the identified one or more recipients; and
      in response to identifying the one or more recipients and the message content that correspond to the particular defined motion pattern, initiating transmission, to the identified one or more recipients, a text message that includes the message content.

2. The method of claim 1, wherein identifying the one or more recipients and the message content that correspond to the particular defined motion pattern includes:
   identifying one or more mobile devices within a predetermined proximity to the wearable device; and
   selecting, as the identified one or more recipients, at least one of the identified one or more mobile devices.

3. The method of claim 1, wherein identifying the one or more recipients and the message content that correspond to the particular defined motion pattern includes:
   identifying a recipient list that is associated with the particular defined motion pattern, wherein the recipient list indicates one or more particular recipients; and
   selecting, as the identified one or more recipients, the one or more particular recipients.

4. The method of claim 3, wherein the recipient list is user configurable.

5. The method of claim 1, wherein the message content is user configurable.

6. The method of claim 1, wherein analyzing a plurality of user profile data to identify a person that has user profile data indicating that their location is within a predetermined proximity to the wearable device includes accessing and analyzing social media content indicating a location for a person.

7. The method of claim 6, wherein analyzing a plurality of user profile data to identify a person that has user profile data indicating that their location is within a predetermined proximity to the wearable device includes determining if a device associated with the person is within a threshold distance of the wearable device.

8. A method of tactile messaging via a wearable device, the method comprising:
by a processor of a computing device;
receiving, from a user, indications of an input message content and one or more recipients;
receiving from the user, a selection of a particular defined motion pattern of a plurality of defined motion patterns, wherein each defined motion pattern is predetermined to correspond to motion data generated in response to tapping, on the wearable device, in a particular sequence; and
associating the particular defined motion pattern with the input message content and the one or more recipients including analyzing a plurality of user profile data to identify a person that has user profile data indicating that their location is within a predetermined proximity to the wearable device; and
selecting the person as the identified one or more recipients.

9. The method of claim 8, further comprising:
in response to detecting motion data that corresponds to the particular defined motion pattern, initiating transmission, to the identified one or more recipients, of a text message that includes the message content.

10. A method of tactile messaging via a wearable device, the method comprising:
by a processor of a computing device:
determining a tapping pattern based at least in part on one or more inputs from one or more sensors;
identifying a response based at least in part on a correspondence between the tapping pattern to one of a plurality of tapping patterns, where the plurality of tapping patterns correspond to respective responses wherein identifying the response includes sending one or more messages to one or more recipients over one or more communication channels wherein sending one or more messages to one or more recipients includes:
analyzing a plurality of user profile data to identify a person that has user profile data indicating that their location is within a predetermined proximity to the wearable device; and
selecting the person as the identified one or more recipients; and
initiating performance of the response corresponding to the tapping pattern.

11. A wearable device comprising a computer processor and a non-transitory computer memory coupled to the computer processor, wherein the non-transitory computer memory stores computer program instructions that, when executed by the computer processor, cause the computer processor to carry out the steps of:
receiving motion data from an accelerometer within the wearable device;
determining that the received motion data matches a particular defined motion pattern of a plurality of defined motion patterns, wherein each defined motion pattern is predetermined to correspond to motion data generated in response to a user tapping, in a particular sequence, on the wearable device;
in response to determining that the received motion data matches the particular defined motion pattern, identifying one or more recipients and a message content that correspond to the particular defined motion pattern including:
analyzing a plurality of user profile data to identify a person that has user profile data indicating that their location is within a predetermined proximity to the wearable device; and
selecting the person as the identified one or more recipients; and
in response to identifying the one or more recipients and the message content that correspond to the particular defined motion pattern, initiating transmission, to the identified one or more recipients, a text message that includes the message content.

12. The wearable device of claim 11, wherein the computer program instructions, when executed by the computer processor, further cause the computer processor to carry out the steps of:
confirming at least one of a group of confirmation tasks; and
in response to confirming at least one of the group of confirmation tasks, instructing a tactile feedback generator within the wearable device to provide tactile feedback to the user of the wearable device.

* * * * *